United States Patent
Morizur et al.

(10) Patent No.: US 10,000,636 B2
(45) Date of Patent: *Jun. 19, 2018

(54) METHODS FOR IMPROVING CHEMICAL AND FLAME RESISTANCE WITH MULTI-FUNCTIONAL PHOTOACTIVE ADDITIVES

(71) Applicant: SABIC GLOBAL TECHNOLOGIES B.V., Bergen op Zoom (NL)

(72) Inventors: Jean-Francois Morizur, Evansville, IN (US); Paul Dean Sybert, Evansville, IN (US); Peter Johnson, Evansville, IN (US); Thomas L. Evans, Mount Vernon, IN (US); James Franklin Hoover, Evansville, IN (US); Amanda Marie Flores, Evansville, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 485 days.

This patent is subject to a terminal disclaimer.

(21) Appl. No.: 14/213,642

(22) Filed: Mar. 14, 2014

(65) Prior Publication Data

US 2014/0265053 A1    Sep. 18, 2014

Related U.S. Application Data

(60) Provisional application No. 61/792,912, filed on Mar. 15, 2013, provisional application No. 61/792,966, filed on Mar. 15, 2013.

(51) Int. Cl.

| | |
|---|---|
| C08F 2/46 | (2006.01) |
| C08F 2/50 | (2006.01) |
| C08G 61/04 | (2006.01) |
| C08L 77/00 | (2006.01) |
| C08L 69/00 | (2006.01) |
| C08L 51/00 | (2006.01) |
| C08G 77/00 | (2006.01) |
| C08G 64/14 | (2006.01) |

(52) U.S. Cl.
CPC .............. *C08L 77/00* (2013.01); *C08G 64/14* (2013.01); *C08G 77/80* (2013.01); *C08L 51/00* (2013.01); *C08L 69/00* (2013.01)

(58) Field of Classification Search
CPC .......... C08L 77/00; C08L 69/00; C08L 51/00; C08L 67/00; C08L 67/04; C08G 64/14; C08G 77/80
USPC ........... 522/35, 33, 6, 71, 189, 184, 1; 520/1
See application file for complete search history.

(56) References Cited

U.S. PATENT DOCUMENTS

| | | |
|---|---|---|
| 4,153,780 A | 5/1979 | Narita et al. |
| 4,221,645 A | 9/1980 | Adelmann et al. |
| 4,333,809 A | 6/1982 | Schreckenberg et al. |
| 4,338,171 A | 7/1982 | Barie, Jr. et al. |
| 4,367,186 A | 1/1983 | Adelmann et al. |
| 4,749,726 A | 6/1988 | Gupta et al. |
| 4,831,109 A | 5/1989 | Mitra et al. |
| 5,034,496 A | 7/1991 | Bales et al. |
| 5,916,942 A | 6/1999 | Scholl et al. |
| 6,224,949 B1 | 5/2001 | Wright et al. |
| 6,517,910 B2 | 2/2003 | Wright et al. |
| 9,023,912 B2* | 5/2015 | Morizur ................. C08G 64/14 520/1 |
| 2004/0030090 A1 | 2/2004 | Meyer et al. |
| 2004/0039145 A1 | 2/2004 | Silva et al. |
| 2005/0049369 A1 | 3/2005 | Oneil et al. |
| 2006/0014650 A1 | 1/2006 | Vanmaele et al. |
| 2006/0074156 A1 | 4/2006 | Ebeling et al. |
| 2007/0027268 A1 | 2/2007 | Di et al. |
| 2007/0105994 A1* | 5/2007 | Li ........................... C08L 69/00 524/115 |
| 2008/0081893 A1 | 4/2008 | Hoover et al. |
| 2008/0125527 A1* | 5/2008 | Tsuneishi ................ C08L 25/04 524/261 |
| 2010/0075125 A1 | 3/2010 | Maas et al. |
| 2011/0065848 A1 | 3/2011 | Jung et al. |
| 2014/0178665 A1 | 6/2014 | Morizur et al. |
| 2014/0179821 A1* | 6/2014 | Morizur ................. C08G 64/14 522/35 |
| 2014/0234629 A1 | 8/2014 | Sun et al. |

(Continued)

FOREIGN PATENT DOCUMENTS

| | | |
|---|---|---|
| CN | 1454914 A | 11/2003 |
| CN | 102159643 A | 8/2011 |

(Continued)

OTHER PUBLICATIONS

Kurzidim et al, WO 2004/013229 Machine Translation, Feb. 12, 2004.*
International Search Report for PCT/US2014/028850 dated Jul. 8, 2014.
International Search Report from a co-pending application (PCT/US2013/077209) dated Mar. 13, 2014.
Chinese Office Action of Chinese Application No. 201380063866.0 dated Apr. 8, 2016 (with English translation).
Chinese Office Action of Chinese Application No. 201380063866.0 dated Oct. 19, 2016 (with English translation).

(Continued)

Primary Examiner — Jessica Whiteley
(74) Attorney, Agent, or Firm — Cantor Colburn LLP

(57) ABSTRACT

Polymeric blends having improved flame retardance properties and good ductility at low temperatures are disclosed. The blend is formed from (A) a photoactive additive that is a cross-linkable polycarbonate resin containing a photoactive group derived from a dihydroxybenzophenone; and (B) a polymer resin which is different from the photoactive additive. The additive can be a compound, oligomer, or polymer. When exposed to ultraviolet light, crosslinking will occur between the photoactive additive and the polymer resin, enhancing the chemical resistance and flame retardance while maintaining ductility.

20 Claims, 6 Drawing Sheets

(56) References Cited

U.S. PATENT DOCUMENTS

| | | | |
|---|---|---|---|
| 2014/0272691 A1* | 9/2014 | Calveras | G03F 7/027 430/18 |
| 2014/0275314 A1 | 9/2014 | Morizur et al. | |
| 2014/0275321 A1 | 9/2014 | Morizur et al. | |
| 2014/0275322 A1* | 9/2014 | Morizur | C08G 64/14 522/163 |
| 2014/0275324 A1 | 9/2014 | Morizur et al. | |
| 2015/0218309 A1 | 8/2015 | Morizur et al. | |

FOREIGN PATENT DOCUMENTS

| | | |
|---|---|---|
| DE | 2746139 A1 | 4/1979 |
| DE | 2746141 | 4/1979 |
| DE | 28 29 258 A1 | 1/1980 |
| DE | 29 30 787 A1 | 2/1981 |
| EP | 0001577 A1 | 5/1979 |
| EP | 0006579 A1 | 1/1980 |
| EP | 0068014 E1 | 1/1983 |
| EP | 0347682 A2 | 12/1989 |
| EP | 1093471 B1 | 12/2007 |
| JP | 08238309 | 9/1996 |
| JP | 2002226571 | 8/2002 |
| WO | 1996033156 | 10/1996 |
| WO | 1998022522 A | 5/1998 |
| WO | 2004-013229 * | 2/2004 |
| WO | WO 2004/013229 A1 | 2/2004 |
| WO | 2014032616 A1 | 3/2014 |

OTHER PUBLICATIONS

Chinese Office Action of Chinese Application No. 201480016229.2 dated Jan. 5, 2017 (with English translation).

Wang et al., "Photocrosslinking of poly(ethylene terephthalate) copolymers containing photoreactive comonomers", Polymer, vol. 46, 2008, pp. 6897-6909.

* cited by examiner

METHODS FOR IMPROVING CHEMICAL AND FLAME RESISTANCE WITH MULTI-FUNCTIONAL PHOTOACTIVE ADDITIVES This application claims priority to U.S. Provisional Patent Application Ser. No. 61/792,912, filed Mar. 15, 2013; and to U.S. Provisional Patent Application Ser. No. 61/792,966, filed Mar. 15, 2013. The disclosure of each application is hereby fully incorporated by reference herein.

BACKGROUND

The present disclosure relates to polymeric blends containing a photoactive additive and a non-photoactive polymeric base resin that is different from the photoactive additive itself. More specifically, the additive comprises a photoactive group derived from a dihydroxybenzophenone. Upon exposure to ultraviolet radiation, the photoactive additive will crosslink with itself and/or with the polymeric base resin, improving overall chemical resistance, flame retardance, and other characteristics. Also disclosed are products (e.g. molded articles, sheets, films, molded components, etc.) formed from such blends.

Polycarbonates (PC) are synthetic engineering thermoplastic resins with desirable properties such as high impact strength and toughness, heat resistance, weather and ozone resistance, and good ductility. Polycarbonate polymers/resins and blends containing polycarbonate polymers also exhibit flame retardance properties. However, such polymers drip when exposed to a flame, and this behavior worsens as the wall thickness decreases. This behavior greatly diminishes their use in transparent and opaque thin wall applications where a V0 or 5VA flame retardance rating is required. These polymers also have relatively poor chemical resistance. It would be desirable to provide additives that can improve these properties.

BRIEF DESCRIPTION

The present disclosure relates to a polymeric blend which has improved crosslinking properties. The blend includes photoactive additives which can be used to crosslink resins (e.g. polycarbonates) and improve their flame resistance and chemical resistance. In particular embodiments, the photoactive additives are polycarbonate copolymers containing a dihydroxybenzophenone monomer that can crosslink when exposed to ultraviolet (UV) radiation.

Disclosed in various embodiments are polymeric blends, comprising: a photoactive additive that is a cross-linkable polycarbonate resin containing a photoactive group derived from a dihydroxybenzophenone; and a polymer resin which is different from the photoactive additive.

The polymer resin is sometimes a polyester, a polyester-carbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In other embodiments, the polymer resin is a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an ABS resin, an ASA resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units.

Sometimes, the polymer resin is a homopolycarbonate, a copolycarbonate, a polycarbonate-polysiloxane copolymer, a polyester-polycarbonate, or a p-cumyl phenol capped poly(isophthalate-terephthalate-resorcinol ester)-co-(bisphenol-A carbonate) copolymer. The polymer resin can be a p-cumyl phenol capped poly(isophthalate-terephthalate-resorcinol ester)-co-(bisphenol-A carbonate) polymer or a polycarbonate-polysiloxane copolymer having a polysiloxane content from 0.4 wt % to 25 wt %. The polycarbonate-polysiloxane copolymer may be a siloxane block co-polycarbonate comprising from about 6 wt % siloxane (±10%) to about 20 wt % siloxane (±10%), and having a siloxane chain length of 10 to 200.

In other embodiments, the polymer resin is a polyphosphonate polymer, a polyphosphonate copolymer, or a poly(polyphosphonate)-co-(BPA carbonate) copolymer.

Alternatively, the polymer resin can be selected from the group consisting of a polycarbonate-polysiloxane copolymer; a polycarbonate resin having an aliphatic chain containing at least two carbon atoms as a repeating unit in the polymer backbone; an ethylene-acrylic ester-glycidyl acrylate terpolymer; a copolyester polymer; a bisphenol-A homopolycarbonate; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; a dimethyl bisphenol cyclohexane-co-bisphenol-A copolymer; a polyetherimide; a polyethersulfone; and a copolycarbonate of bisphenol-A and 1,1-bis(4-hydroxyphenyl)-3,3,5-trimethylcyclohexane).

The weight ratio of the photoactive additive to the polymer resin can be from 1:99 to 99:1, including from about 50:50 to about 85:15 or from about 10:90 to about 15:85.

In particular embodiments, the photoactive additive is formed from a reaction comprising: the dihydroxybenzophenone; a diol chain extender; a first linker moiety comprising a plurality of linking groups, wherein each linking group reacts with the hydroxyl groups of the dihydroxybenzophenone and the diol chain extender; and an end-capping agent. In particular embodiments, the dihydroxybenzophenone is 4,4'-dihydroxybenzophenone.

In some embodiments, the photoactive additive has a weight average molecular weight of 15,000 or greater prior to UV exposure.

The molar ratio of the dihydroxybenzophenone to the first linker moiety can be from 1:2 to 1:200 prior to UV exposure.

The cross-linkable polycarbonate resin may have a weight-average molecular weight of between 17,000 and 80,000 Daltons, or between 17,000 and 35,000 Daltons, as measured by GPC using a UV-VIS detector and polycarbonate standards and prior to UV exposure. The cross-linkable polycarbonate resin sometimes has a polydispersity index (PDI) of between 2.0 and 3.0 as measured by GPC using a UV-VIS detector and polycarbonate standards prior to UV exposure. The cross-linkable polycarbonate resin can have a melt flow rate of about 1 to about 40 g/10 min at 300° C./1.2 kg/360 sec dwell. A plaque made from the polycarbonate can achieve UL94 5VA performance at a thickness of 1.5 mm (±10%) after UV irradiation of 36.0 J/cm² UVA.

The blend may further comprise a flame retardant. The flame retardant can be potassium perfluorobutane sulfonate (Rimar salt), potassium diphenyl sulfone-3-sulfonate (KSS), or a combination thereof. In particular embodiments, the flame retardant is Rimar salt which is present in an amount of about 0.06 wt % to about 0.08 wt %, based on the total weight of the composition. Particular embodiments comprise the flame retardant, and further comprise a heat stabilizer and a mold release agent.

The blend can also further comprise an impact modifier, UV stabilizer, colorant, flame retardant, heat stabilizer, plasticizer, lubricant, mold release agent, filler, reinforcing agent, antioxidant agent, antistatic agent, blowing agent, or radiation stabilizer.

In particular embodiments, the polymer resin is a polycarbonate-polysiloxane copolymer. The polycarbonate-polysiloxane copolymer may have a siloxane content of from about 4 wt % to about 8 wt %, based on the total weight of the blend.

Also disclosed are various products formed from the blends described herein. In particular embodiments, the product is a molded article, a film, a sheet, a layer of a multilayer film, or a layer of a multilayer sheet. The product can be formed by injection molding, overmolding, co-injection molding, extrusion, multilayer extrusion, rotational molding, blow molding, or thermoforming. The product can be exposed to UV radiation to cause crosslinking of the cross-linkable polycarbonate resin.

Also disclosed are crosslinked layers formed from a polymeric blend that has been exposed to UV radiation, the blend comprising: a photoactive additive that is a cross-linkable polycarbonate resin containing a photoactive group derived from a dihydroxybenzophenone; and a polymer resin which is different from the photoactive additive. The crosslinked layer may contain chains from both the photoactive additive and the polymer resin. The crosslinking may be sufficient to create a continuous insoluble layer containing both the photoactive additive and the polymer resin. In particular embodiments, the crosslinked layer is formed by exposure to filtered UV light providing 0.5 J/cm² of UVA radiation and no detectable UVC radiation. The crosslinked layer can achieve UL94 5VA performance at a thickness of 1.5 mm (±10%) after UV irradiation of 36 J/cm² UVA.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
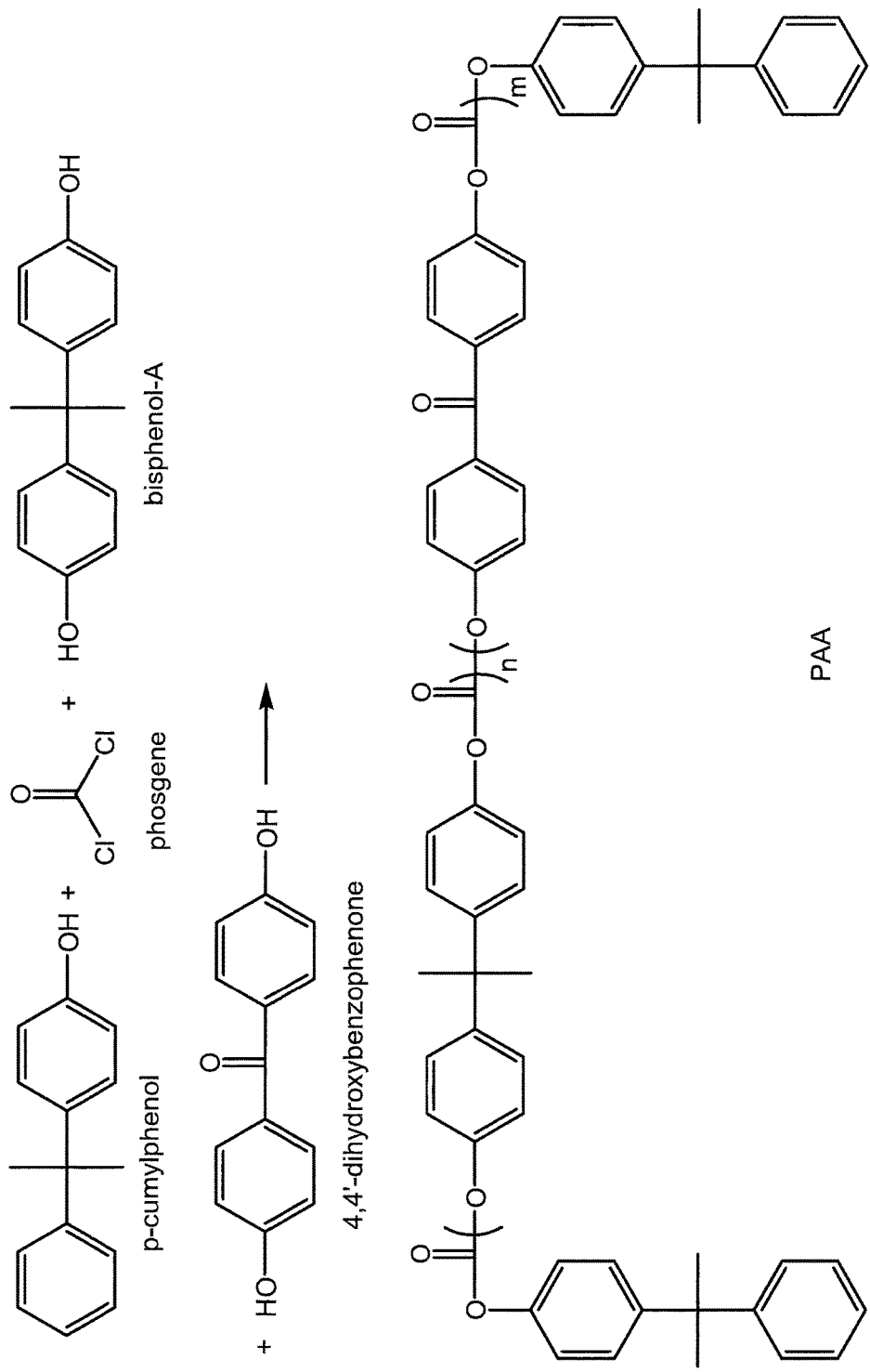
FIG. 1 illustrates the formation of a photoactive additive (oligomer/polymer) from a difunctional photoactive moiety, a first linker moiety, a diol chain extender, and an endcapping agent.

The present disclosure may be understood more readily by reference to the following detailed description of desired embodiments and the examples included therein. In the following specification and the claims which follow, reference will be made to a number of terms which shall be defined to have the following meanings.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value;

they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, the aldehyde group —CHO is attached through the carbon of the carbonyl group.

The term "aliphatic" refers to an linear or branched array of atoms that is not aromatic. The backbone of an aliphatic group is composed exclusively of carbon. The aliphatic group may be substituted or unsubstituted. Exemplary aliphatic groups include, but are not limited to, methyl, ethyl, isopropyl, hexyl, and cyclohexyl.

The term "aromatic" refers to a radical having a ring system containing a delocalized conjugated pi system with a number of pi-electrons that obeys Hückel's Rule. The ring system may include heteroatoms such as nitrogen, sulfur, selenium, silicon and oxygen, or may be composed exclusively of carbon and hydrogen. Aromatic groups are not substituted. Exemplary aromatic groups include, but are not limited to, phenyl, pyridyl, furanyl, thienyl, naphthyl and biphenyl.

The term "ester" refers to a radical of the formula —CO—O—, wherein the carbon atom and the oxygen atom are both covalently bonded to carbon atoms.

The term "carbonate" refers to a radical of the formula —O—CO—O—, wherein the oxygen atoms are both covalently bonded to carbon atoms. Note that a carbonate group is not an ester group, and an ester group is not a carbonate group.

The term "hydroxyl" refers to a radical of the formula —OH, wherein the oxygen atom is covalently bonded to a carbon atom The term "alkyl" refers to a radical composed entirely of carbon atoms and hydrogen atoms which is fully saturated. The alkyl radical may be linear, branched, or cyclic.

The term "aryl" refers to an aromatic radical that is composed exclusively of carbon and hydrogen. Exemplary aryl groups include phenyl, naphthyl, and biphenyl. Note that "aryl" is a subset of aromatic.

The term "heteroaryl" refers to an aromatic radical having a ring system that is composed of carbon, hydrogen, and at least one heteroatom. Exemplary heteroaryl groups include pyridyl, furanyl, and thienyl. Note that "heteroaryl" is a subset of aromatic, and is exclusive of "aryl".

The term "halogen" refers to fluorine, chlorine, bromine, and iodine.

The term "alkoxy" refers to an alkyl radical which is attached to an oxygen atom, i.e. —O—$C_nH_{2n+1}$.

The term "aryloxy" refers to an aryl radical which is attached to an oxygen atom, e.g. —O—$C_6H_5$.

The term "hydrocarbon" refers to a radical which is composed exclusively of carbon and hydrogen. Both alkyl and aryl groups are considered hydrocarbon groups.

The term "alkenyl" refers to a radical composed entirely of carbon atoms and hydrogen atoms which contains at least one carbon-carbon double bond that is not part of an aryl or heteroaryl structure. The alkenyl radical may be linear, branched, or cyclic. An exemplary alkenyl radical is vinyl (—CH=$CH_2$).

The term "alkenyloxy" refers to a alkenyl radical which is attached to an oxygen atom, e.g. —O—CH=$CH_2$.

The term "arylalkyl" refers to an aryl radical which is attached to an alkyl radical, with the aryl radical being appended to the parent molecular moiety through the alkyl radical, e.g. benzyl (—$CH_2$—$C_6H_5$).

The term "alkylaryl" refers to an alkyl radical which is attached to an aryl radical, with the alkyl radical being appended to the parent molecular moiety through the aryl radical, e.g. tolyl (—$C_6H_4$—$CH_3$).

The term "amino" refers to a radical of the formula R—$NH_2$, wherein R is a carbon atom. For purposes of this disclosure, the amino group is a primary amino group, i.e. contains two hydrogen atoms.

The term "carbamate" refers to a radical of the formula —NH—CO—O—, wherein the nitrogen atom and the oxygen atom are both covalently bonded to carbon atoms.

The term "copolymer" refers to a polymer derived from two or more structural unit or monomeric species, as opposed to a homopolymer, which is derived from only one structural unit or monomer.

The term "$C_3$-$C_6$ cycloalkyl" refers to cyclopropyl, cyclobutyl, cyclopentyl or cyclohexyl.

The terms "Glass Transition Temperature" or "Tg" refer to the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius. The glass transition temperatures (Tg) described herein are measures of heat resistance of, for example, polycarbonate and polycarbonate blends. The Tg can be determined by differential scanning calorimetry, for example by using a TA Instruments Q1000 instrument, for example, with setting of 20° C./min ramp rate and 40° C. start temperature and 200° C. end temperature.

The term "halo" means that the substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

The term "haze" refers to the percentage of transmitted light, which in passing through a specimen deviates from the incident beam by forward scattering. Percent (%) haze may be measured according to ASTM D 1003-07.

The term "Melt Volume Rate" (MVR) or "Melt Flow Rate (MFR)" refers to the flow rate of a polymer in a melt phase as determined using the method of ASTM D1238-10. The MVR of a molten polymer is measured by determining the amount of polymer that flows through a capillary of a specific temperature over a specified time using standard weights at a fixed temperature. MVR is expressed in cubic centimeter per 10 minutes, and MFR is expressed in grams per 10 minutes. The higher the MVR or MFR value of a polymer at a specific temperature, the greater the flow of that polymer at that specific temperature.

The term "Percent transmission" or "% transmission" refers to the ratio of transmitted light to incident light, and may be measured according to ASTM D 1003-07.

"Polycarbonate" as used herein refers to an oligomer or a polymer comprising residues of one or more monomers, joined by carbonate linkages.

"Thermal stability" as used herein refers to resistance of a polymer to molecular weight degradation under thermal conditions. Thus, a polymer with poor thermal stability may show significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions such as melt viscosity changes.

The term "crosslink" and its variants refer to the formation of a stable covalent bond between two polymers/oligomers. This term is intended to encompass the formation of covalent bonds that result in network formation, or the formation of covalent bonds that result in chain extension. The term "cross-linkable" refers to the ability of a polymer/oligomer to form such stable covalent bonds.

The present disclosure refers to "polymers," "oligomers", and "compounds". A polymer is a large molecule composed of multiple repeating units chained together, the repeating units being derived from a monomer. One characteristic of a polymer is that different molecules of a polymer will have different lengths, and a polymer is described as having a molecular weight that is based on the average value of the chains (e.g. weight average or number average molecular weight). The art also distinguishes between an "oligomer" and a "polymer", with an oligomer having only a few repeating units, while a polymer has many repeating units. For purposes of this disclosure, the term "oligomer" refers to such molecules having a weight average molecular weight of less than 15,000, and the term "polymer" refers to molecules having a weight average molecular weight of 15,000 of more, as measured by GPC using polycarbonate molecular weight standards. In contrast, for a compound, all molecules will have the same molecular weight. Compared to a polymer, a compound is a small molecule. These molecular weights are measured prior to any UV exposure.

Additives

The present disclosure relates to photoactive additives (PAA), and in particular to a polymeric blend containing such additives. When the photoactive additive is added to one or more base resins and is then exposed to the appropriate wavelength of light, the resulting composition will have improved anti-drip and flame retardant properties compared to the base resin(s) alone or to the composition prior to the light exposure. For example, the chemical resistance, propensity to drip during burning, or the propensity to form a hole when exposed to a flame can be improved. Improved flame resistance performance characteristics may include flame out time (FOT) and time to drip (TTD). The compositions, blended or neat, can be used to provide thin-walled materials that are UL94 5VA compliant. The compositions can be used to provide thin-walled materials that are 5VA compliant and highly transparent. The compositions may also exhibit good chemical resistance, tear resistance, impact strength, ductility, hydrolytic stability, and/or weatherability. Compositions comprising a cross-linked polycarbonate formed from the PAA are also contemplated.

Generally, the photoactive additives (PAA) of the present disclosure include photoactive moieties that are covalently linked together through a first linker moiety and possibly a secondary linker moiety. The photoactive moieties contain a photoactive ketone group that, when exposed to the appropriate wavelength(s) of ultraviolet light, will form a stable covalent bond between the PAA and the polymeric resin. The PAA should be stable at conventional blending, forming, and processing temperatures (i.e. stable at 350° C. or above). The PAA also should not induce the degradation of the polymeric resin with which it is blended.

The term "photoactive moiety" refers to a moiety that, when exposed to ultraviolet light of the appropriate wavelength, crosslinks with another molecule. Thus, for example, the bisphenol-A monomer in a bisphenol-A homopolycarbonate would not be considered a photoactive moiety, even though photo-Fries rearrangement can occur upon exposure to light, because the atoms do not participate in crosslinking but merely in rearrangement of the polymer backbone.

The photoactive additive is formed from a reaction mixture containing at least a first photoactive moiety and a first linker moiety. The first photoactive moiety comprises (i) a ketone group and (ii) two phenolic groups. The linker moiety comprises a plurality of linking groups that can react with the phenolic groups of the first photoactive moiety. The reaction product is the photoactive additive (PAA). The molar ratio of the first photoactive moiety to the first linker moiety can be from 1:2 to 1:200. An end-capping agent is also included in the reaction mixture. As desired, a diol chain extender can also be included. The end-capping agent and the chain diol extender do not have photoactive properties.

The term "ketone group" refers to a carbonyl group (—CO—) that is bonded to two other carbon atoms (i.e. —R—CO—R'—). The two other carbon atoms can be in an aliphatic group or in an aromatic group. An ester group and a carboxylic acid group are not considered to be a ketone group because the carbonyl group is bonded to one carbon atom and an oxygen atom.

The term "phenolic group" refers to a phenyl group (—$C_6H_4$—) with a hydroxyl group (—OH) covalently bonded to a carbon atom in the phenyl group.

The photoactive moiety can be a dihydroxyphenone, wherein the phenolic group is directly bonded to the ketone group. Examples of such photoactive moieties include those having the structure of one of Formulas (16)-(21):

Formula (16)

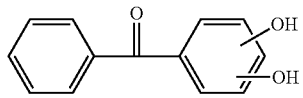

Formula (17)

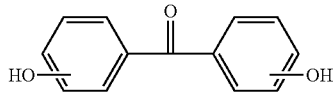

Formula (18)

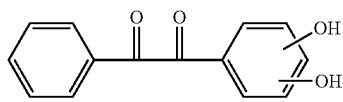

Formula (19)

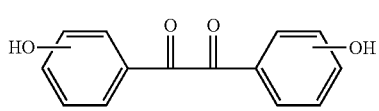

Formula (20)

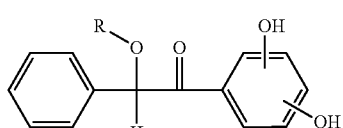

Formula (21)

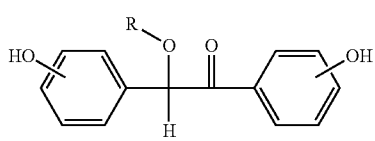

wherein R is H, alkyl, or aryl.

The compound of Formula (16) is a dihydroxyphenyl-phenylmethanone. The compound of Formula (17) is a bis(hydroxyphenyl)methanone. The compounds of Formulas (16) or (17) could also be referred to as dihydroxybenzophenones. The compound of Formula (18) is a 1-dihydroxyphenyl-2-phenylethane-1,2-dione. The compound of Formula (19) is a 1,2-bis(hydroxyphenyl)ethane-1,2-dione. The compounds of Formulas (18) or (19) could also be referred to as dihydroxybenzils. The compound of Formula (20) is a 1-(dihydroxyphenyl)-2-hydrocarboxy-2-phenylethanone. The compound of Formula (21) is a 1,2-bis(hydroxyphenyl)-2-hydrocarboxy-ethanone.

In some other embodiments, the R and R' groups attached to the ketone group form a ring structure. In such embodiments, the aromatic rings can include both aryl rings or heteroaryl rings. Examples of such photoactive moieties include those having the structure of one of Formulas (26)-(29):

Formula (26)

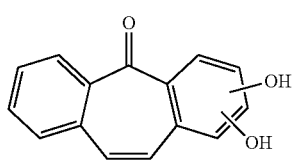

Formula (27)

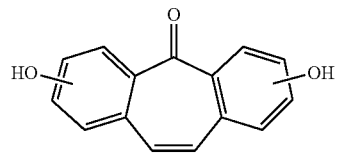

Formula (28)

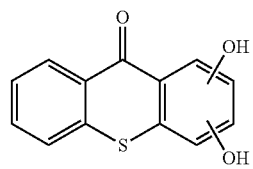

Formula (29)

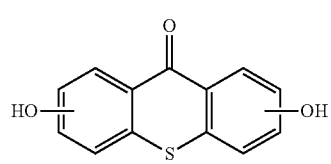

The compounds of Formula (26) and (27) are a dihydroxydibenzo[1,3-e:1',2'-f][7]annulen-11-one. The compounds of Formula (28) and (29) are a dihydroxythioxanthen-9-one. The different formulas reflect the location of the two hydroxyl groups (either on the same ring, or on a different ring).

The photoactive moiety is reacted with one or more first linker moieties. At least one of the first linker moieties comprises a plurality of functional groups that can react with a phenolic group of the photoactive moiety. Examples of such functional groups include a carboxylic acid (and anhydrides thereof), an acyl halide, an alkyl ester, and an aryl ester. These functional groups are illustrated below in general formula (A):

Formula (A)

where Y is hydroxyl, halogen, alkoxy, or aryloxy. The functional groups can be joined to an aliphatic group or an aromatic group which serves as a "backbone" for the linker moiety. In particular embodiments, the linker moiety can have two, three, four, or even more functional groups.

Some examples of first linker moieties which have two functional groups and can react with the photoactive moieties include those having the structure of one of Formulas (30, (32), or (33):

Formula (30)

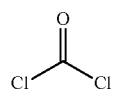

Formula (32)

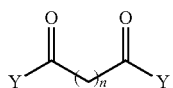

Formula (33)

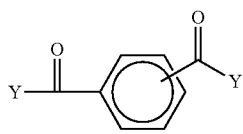

where Y is hydroxyl, halogen, alkoxy, or aryloxy; and where n is 1 to 20. It should be noted that Formula (33) encompasses isophthalic acid and terephthalic acid.

Some examples of first linker moieties which have three functional groups and can react with the photoactive moieties include those having the structure of one of Formulas (36)-(38):

Formula (36)

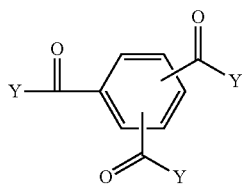

Formula (37)

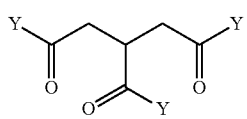

Formula (38)

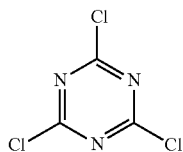

where Y is hydroxyl, halogen, alkoxy, or aryloxy.

Some examples of first linker moieties which have four functional groups and can react with the photoactive moieties include those having the structure of one of Formulas (39)-(41):

Formula (39)

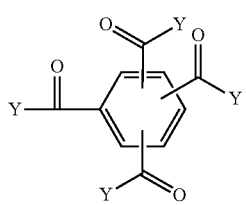

Formula (40)

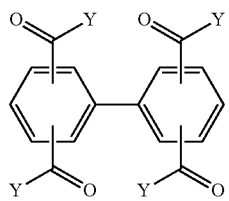

Formula (41)

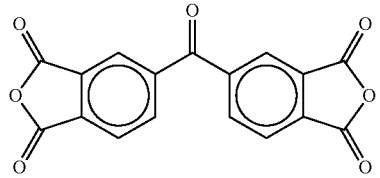

where Y is hydroxyl, halogen, alkoxy, or aryloxy.

In some embodiments, functional groups can be provided by short oligomers, including oligomers containing glycidyl methacrylate monomers with styrene or methacrylate monomers, or epoxidized novolac resins. These oligomers can permit the desired the number of functional groups to be provided. Such oligomers are generalized by the structure of Formula (42):

Formula (42)

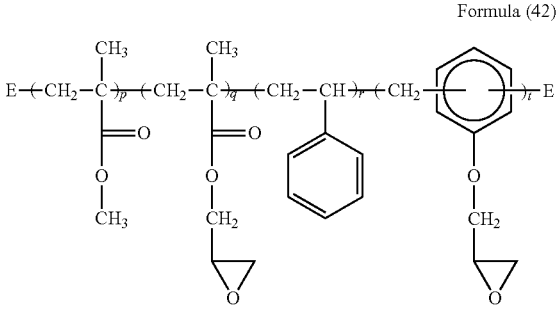

where E is hydrogen or an endcapping agent, p is the number of methacrylate monomers, q is the number of methacrylate monomers, r is the number of styrene monomers, and t is the number of epoxidized novolac (phenol-formaldehyde) monomers. Generally, $p+q+r+t \leq 20$. When the oligomer contains glycidyl methacrylate monomers with styrene or methacrylate monomers, generally $t=0$ and $q \geq 1$. Similarly, for novolac resins, $p=q=r=0$. The epoxy groups can be reacted with the phenolic group of the photoactive moiety.

In particularly desired embodiments, the photoactive additive can be formed from a reaction mixture containing the photoactive moiety, the first linker moiety, and one or more diol chain extenders. The diol chain extender is a molecule that contains only two hydroxyl groups and is not photoactive when exposed to light. The chain extender can be used to provide a desired level of miscibility when the additive is mixed with other polymeric resins. The photoactive additive may comprise from about 75 wt % to about 99.5 wt %, or from 95 wt % to about 99 mole %, or from about 80 wt % to about 95 wt %, or from about 80 wt % to about 90 wt %, of the diol chain extender.

A first exemplary diol chain extender is a bisphenol of Formula (B):

(B)

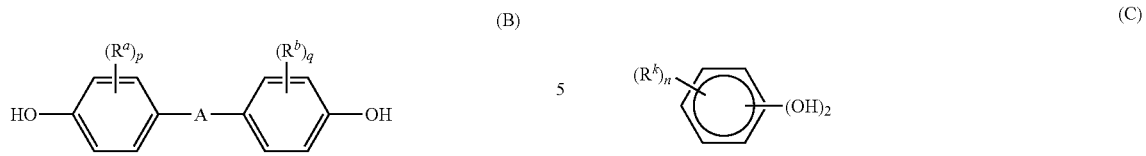

wherein $R^a$ and $R^b$ each represent a halogen atom or a monovalent hydrocarbon group and may be the same or different; p and q are each independently integers of 0 to 4; and A represents one of the groups of formula (B-1):

(B-1)

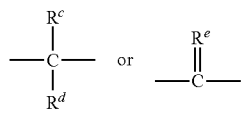

wherein $R^c$ and $R^d$ each independently represent a hydrogen atom or a monovalent linear or cyclic hydrocarbon group and $R^e$ is a divalent hydrocarbon group. For example, A can be a substituted or unsubstituted $C_3$-$C_{18}$ cycloalkylidene.

Specific examples of the types of bisphenol compounds that may be represented by Formula (B) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane; 4,4'-(1-phenylethane-1,1-diyl)diphenol or 1,1-bis(4-hydroxyphenyl)-1-phenyl-ethane (bisphenol-AP); and 1,1-bis(4-hydroxyphenyl)-3,3,5-trimethylcyclohexane) (bisphenol TMC).

A second exemplary diol chain extender is a bisphenol of Formula (C):

(C)

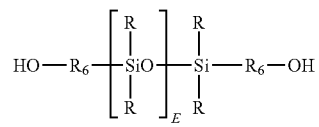

wherein each $R^k$ is independently a $C_{1-10}$ hydrocarbon group, and n is 0 to 4. The halogen is usually bromine. Examples of compounds that may be represented by Formula (C) include resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone.

A third exemplary diol chain extender is a bisphenolpolydiorganosiloxane of Formula (D-1) or (D-2):

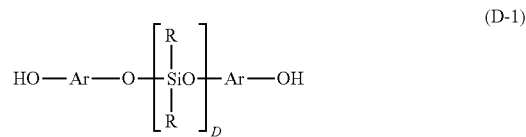

wherein each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, specifically about 2 to about 500, or about 10 to about 200, or more specifically about 10 to about 75.

Specific examples of Formulas (D-1) or (D-2) are illustrated below as Formulas (D-a) through (D-d):

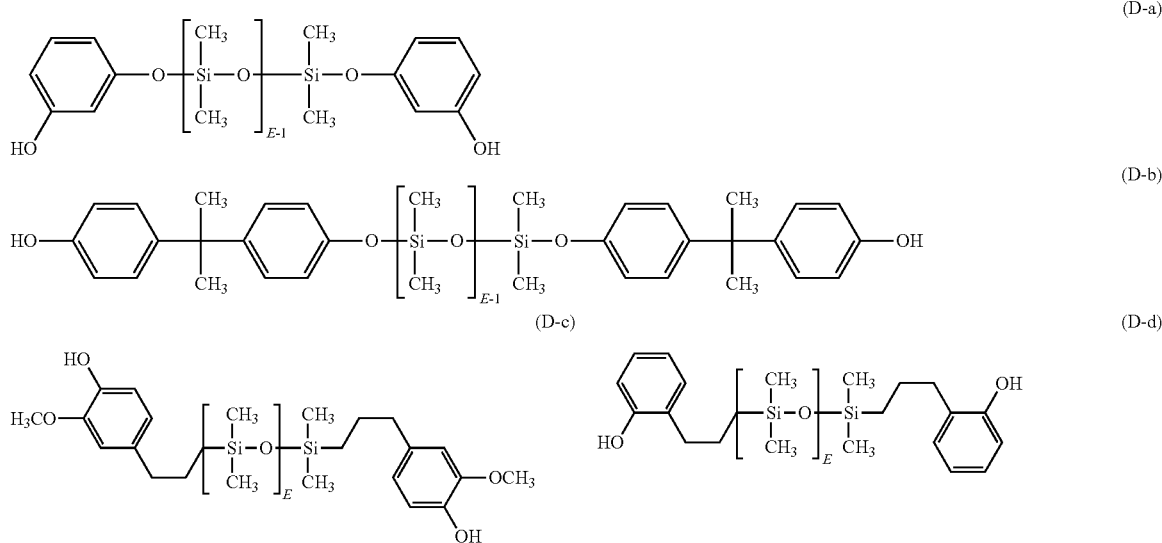

where E is an average value from 10 to 200.

A fourth exemplary diol chain extender is an aliphatic diol of Formula (E):

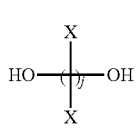
(E)

wherein each X is independently hydrogen, halogen, or alkyl; and j is an integer from 1 to 20. Examples of an aliphatic diol include ethylene glycol, propanediol, 2,2-dimethyl-propanediol, 1,6-hexanediol, and 1,12-dodecanediol.

A fifth exemplary diol chain extender is a dihydroxy compound of Formula (F), which may be useful for high heat applications:

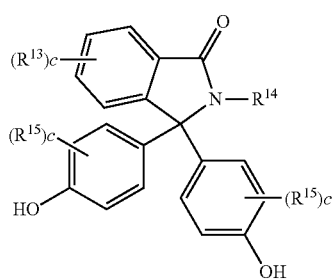
(F)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4. In a specific embodiment, $R^{14}$ is a $C_1$-$C_6$ alkyl or phenyl group. In still another embodiment, $R^{14}$ is a methyl or phenyl group. In another specific embodiment, each c is 0. Compounds of Formula (F) include 3,3-bis(4-hydroxyphenyl)-2-phenylisoindolin-1-one (PPPBP).

Other dihydroxy compounds (i.e. diol chain extenders) that might impart high Tgs to the polycarbonate as a copolycarbonate are dihydroxy compounds having adamantane units, as described in U.S. Pat. No. 7,112,644 and U.S. Pat. No. 3,516,968, which are fully incorporated herein by reference. A compound having adamantane units may have repetitive units of the following formula (G) for high heat applications:

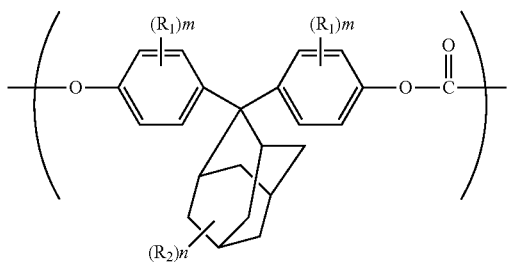
(G)

wherein $R_1$ represents a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms, or a fluoroalkyl group having 1 to 6 carbon atoms; $R_2$ represents a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms, or a fluoroalkyl group having 1 to 12 carbon atoms; m represents an integer of 0 to 4; and n represents an integer of 0 to 14.

Other dihydroxy compounds that might impart high Tgs to the polycarbonate as a copolycarbonate are dihydroxy compounds having fluorene-units, as described in U.S. Pat. No. 7,244,804. One such fluorene-unit containing dihydroxy compound is represented by the following formula (H) for high heat applications:

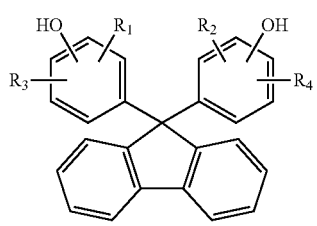
(H)

wherein $R_1$ to $R_4$ are each independently a hydrogen atom, a hydrocarbon group with 1 to 9 carbon atoms which may contain an aromatic group, or a halogen atom.

Another diol chain extender that could be used is an isosorbide. A monomer unit derived from isosorbide may be an isorbide-bisphenol unit of Formula (I):

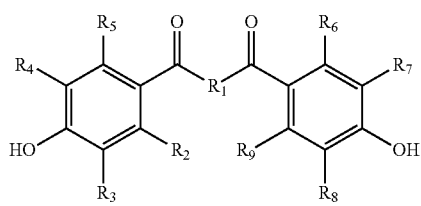
(I)

wherein $R_1$ is an isosorbide unit and $R_2$-$R_9$ are each independently a hydrogen, a halogen, a $C_1$-$C_6$ alkyl, a methoxy, an ethoxy, or an alkyl ester.

The $R_1$ isosorbide unit may be represented by Formula (I-a):

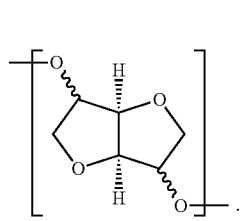
(I-a)

The isosorbide unit may be derived from an isosorbide, a mixture of isosorbide, a mixture of isomers of isosorbide, and/or from individual isomers of isosorbide. The stereochemistry for the isosorbide-based carbonate units of Formula (I) is not particularly limited. These diols may be prepared by the dehydration of the corresponding hexitols. Hexitols are produced commercially from the corresponding sugars (aldohexose). Aliphatic diols include 1,4:3,6-dianhydro-D glucitol; 1,4:3,6-dianhydro-D mannitol; and 1,4:3,6-dianhydro-L iditol; and any combination thereof. Isosorbides are available commercially from various chemical suppliers including Cargill, Roquette, and Shanxi. The isosorbide-bisphenol may have a pKa of between 8 and 11.

As previously explained, a first photoactive moiety is reacted with a first linker moiety to obtain the photoactive additive. In some embodiments, a secondary linker moiety is included in the reaction mixture. The secondary linker moiety has at least three functional groups, each of which can react with the functional groups of the first linker moiety, and acts as a branching agent. Generally, the functional groups of the secondary linker moiety are hydroxyl groups.

Some examples of secondary linker moieties which have three functional groups and can react with the first linker moiety include those having the structure of one of Formulas (43)-(46):

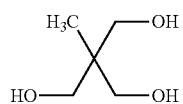

Formula (43)

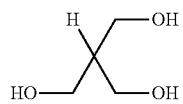

Formula (44)

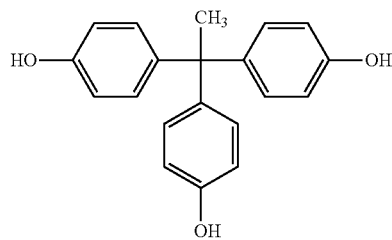

Formula (45)

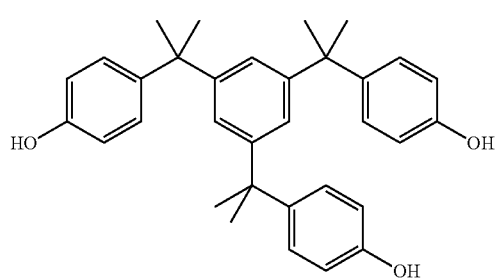

Formula (46)

Some examples of secondary linker moieties which have four functional groups and can react with the first linker moiety include those having the structure of one of Formulas (47)-(48):

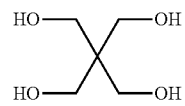

Formula (47)

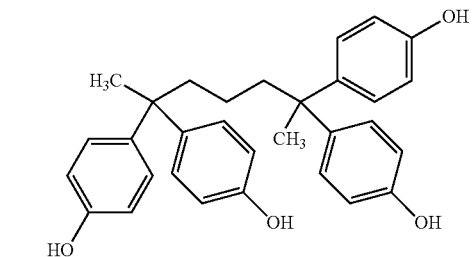

Formula (48)

In some embodiments, the secondary linker moiety can be an oligomer, made from an epoxidized novolac monomer. These oligomers can permit the desired number of functional groups to be provided. Such oligomers are generalized by the structure of Formula (49):

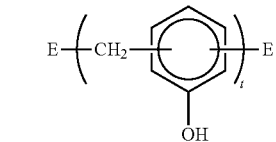

Formula (49)

wherein E is hydrogen or an endcapping agent; and t is an integer from 1 to 20.

An end-capping agent is generally used to terminate any polymer chains of the photoactive additive. The end-capping agent (i.e. chain stopper) is a monohydroxy compound, a mono-acid compound, or a mono-ester compound. Exemplary endcapping agents include phenol, p-cumylphenol (PCP), resorcinol monobenzoate, p-tert-butylphenol, octylphenol, p-cyanophenol, and p-methoxyphenol. The term "end-capping agent" is used herein to denote a compound that is not photoactive when exposed to light. For example, the end-capping agent does not contain a ketone group. The photoactive additive may comprise about 0.5 mole % to about 5.0 mole % endcap groups derived from the end-capping agent.

Depending on the selection of the first linker moiety, the cross-linkable polycarbonate of the present disclosure may be a polyester-polycarbonate copolymer. The molar ratio of ester units to carbonate units in the polyester-polycarbonate may vary broadly, for example 1:99 to 99:1, specifically 10:90 to 90:10, more specifically 25:75 to 75:25, optionally expanded depending on the desired properties of the final composition. The polyester units may be derived from an aliphatic or aromatic dicarboxylic acid. Aliphatic dicarboxylic acids may have from 6 to about 36 carbon atoms, optionally from 6 to 20 carbon atoms. Exemplary aliphatic dicarboxylic acids include adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, or $C_{14}$, $C_{18}$ and $C_{20}$ diacids. Exemplary aromatic dicarboxylic acids include isophthalic or terephthalic acid, 1,2-di(p-carboxyphenyl)ethane, 4,4'-dicarboxydiphenyl ether, 4,4'-bisbenzoic acid; 1,4-, 1,5-, or 2,6-naphthalenedicarboxylic acids; and combinations comprising at least one of the foregoing acids. A specific dicarboxylic acid mixture comprises a combination of isophthalic acid and terephthalic acid wherein the weight ratio of isophthalic acid to terephthalic acid is about 91:9 to about 2:98.

The polyester unit of a polyester-polycarbonate may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol-A. In another specific embodiment, the polycarbonate units may be derived from resorcinol and bisphenol-A in a molar ratio of resorcinol carbonate units to bisphenol-A carbonate units of 1:99 to 99:1.

The photoactive additives of the present disclosure can be a compound, an oligomer, or a polymer. The oligomer has a weight average molecular weight (Mw) of less than 15,000, including 10,000 or less. The polymeric photoactive additives of the present disclosure have a Mw of 15,000 or higher. In particular embodiments, the Mw is between 17,000 and 80,000 Daltons, or between 17,000 and 35,000 Daltons. These molecular weights are measured prior to any UV exposure. The Mw may be varied as desired. Polymers/oligomers with relatively higher Mw's generally retain their mechanical properties better, while polymers/oligomers with relatively lower Mw's generally have better flow properties. In some particular embodiments, the Mw of the photoactive additives is about 5,000 or less. During melt processing, such oligomers are more likely to rise to the surface of the product. Long chain aliphatic diols ($C_6$ or higher) can also be used for this purpose. This may increase the concentration of the additive at the surface, and thus increase the crosslinking density at the surface upon exposure to UV light as well.

The product resulting from the reaction in FIG. 1 is illustrative of such photoactive additives. Here, the photoactive additive is formed from a first photoactive moiety, a first linker moiety, a diol chain extender, and an end-capping agent. 4,4'-dihydroxybenzophenone is reacted with phosgene, bisphenol-A, and p-cumylphenol (endcap) to obtain the photoactive additive.

Figure 2:
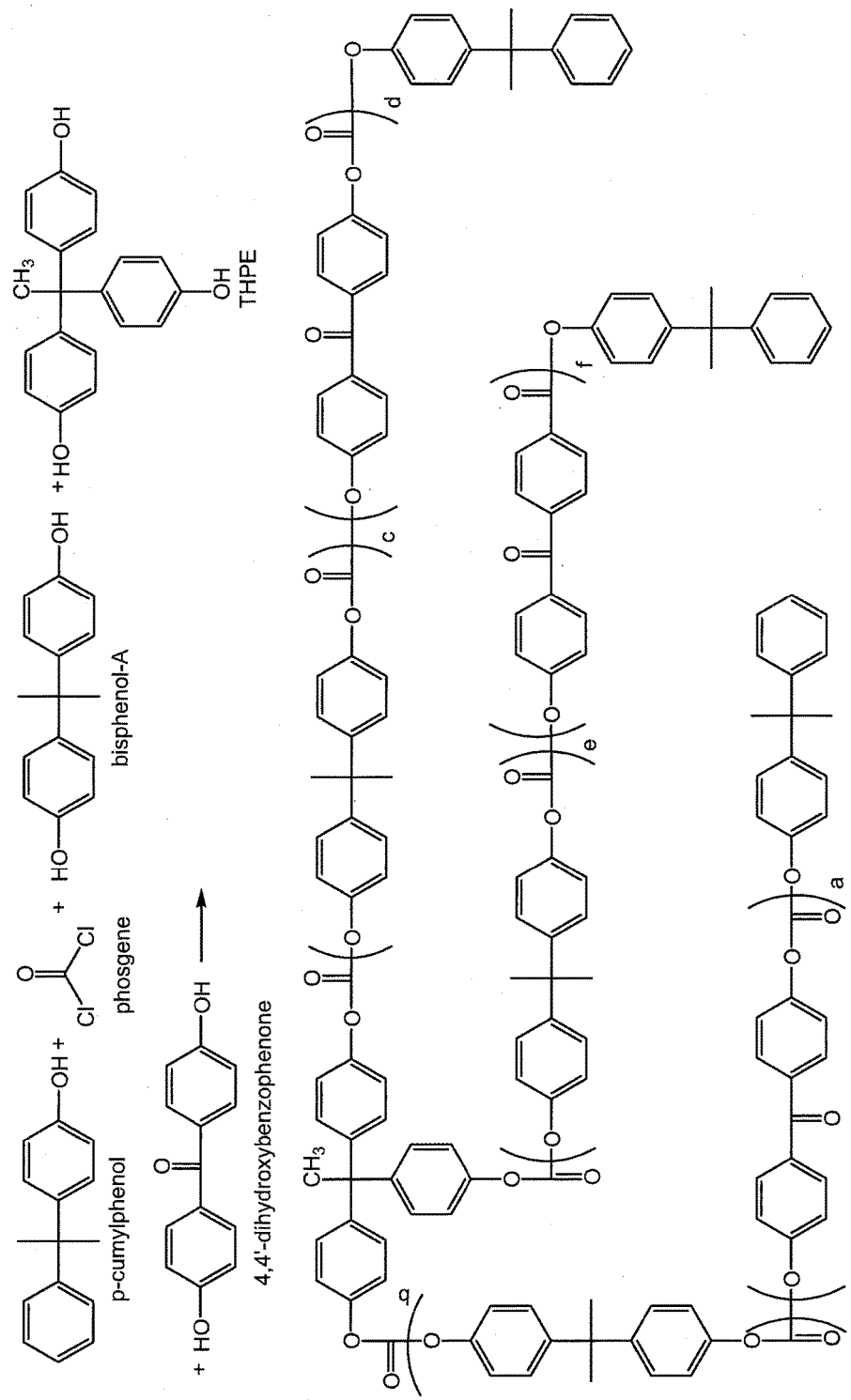
FIG. 2 illustrates the formation of a branched photoactive additive (oligomer/polymer) from a difunctional photoactive moiety, a first linker moiety, a diol chain extender, an endcapping agent, and a secondary linker moiety.

An example of a photoactive additive formed from a first photoactive moiety, a first linker moiety, a diol chain extender, end-capping agent, and a secondary linker moiety is seen in FIG. 2. Here, 4,4'-dihydroxybenzophenone is reacted with phosgene (first linker moiety), bisphenol-A (diol chain extender), tris(hydroxyphenyl)ethane (THPE, secondary linker moiety), and p-cumylphenol (end-capping agent) to obtain the photoactive additive. Note that the THPE (secondary linker moiety) reacts with the phosgene (first linker moiety), not with the 4,4'-dihydroxybenzophenone (photoactive moiety). The resulting photoactive additive (PAA) may be an oligomer or a polymer with a weight average molecular weight and a polydispersity index.

Figure 3:
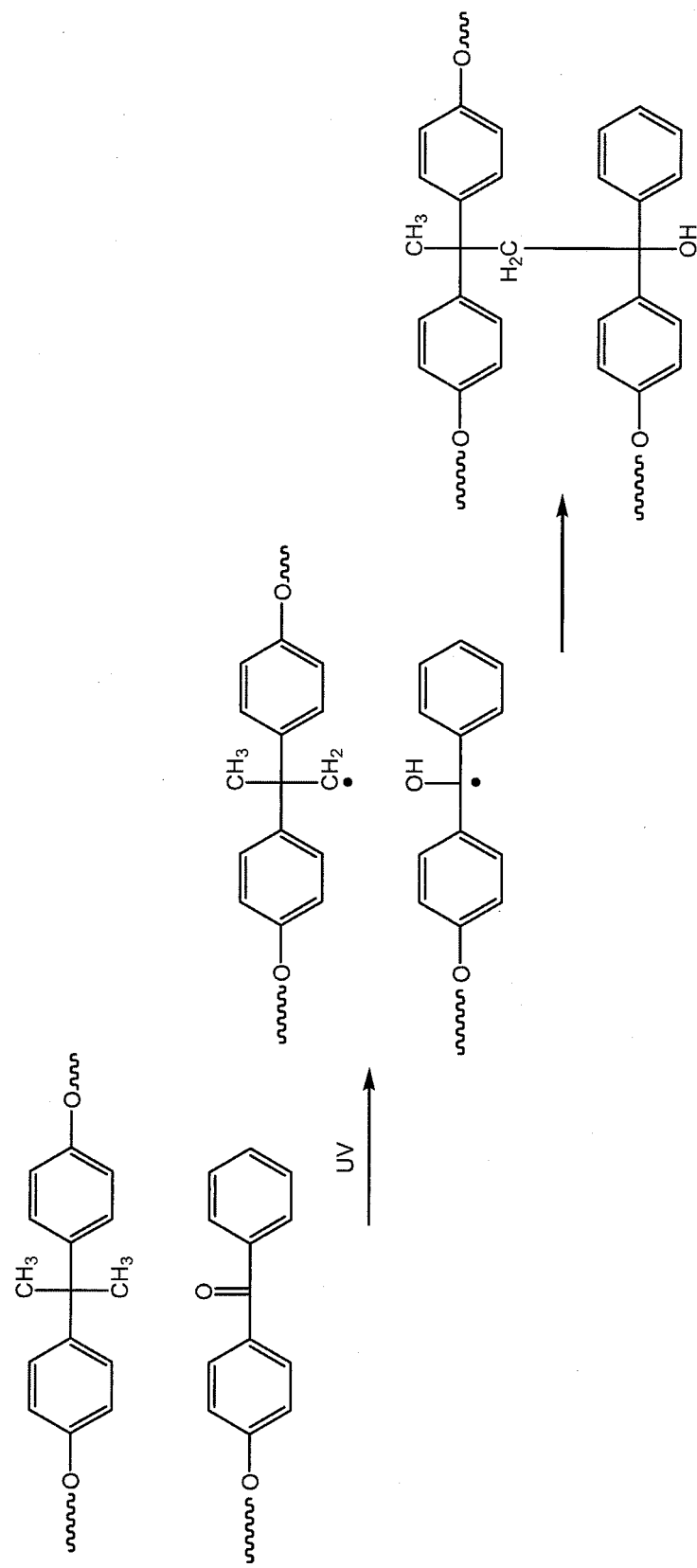
FIG. 3 illustrates the crosslinking mechanism of the photoactive additive.

One crosslinking mechanism of the additives is believed to be due to hydrogen abstraction by the ketone group from an alkyl group that acts as a hydrogen donor and subsequent coupling of the resulting radicals. This mechanism is illustrated in FIG. 3 with reference to a benzophenone (the photoactive moiety) and a bisphenol-A (BPA) monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group. Put another way, the ketone group of the benzophenone could be considered to be a photoactive group. It should be noted that the presence of hydrogen is critical for this reaction to occur. Other mechanisms may occur after the initial abstraction event with base resins containing unsaturated bonds or reactive side groups.

In particular embodiments, the photoactive additives (PAAs) disclosed herein are cross-linkable polycarbonates comprising repeating units derived from a dihydroxybenzophenone monomer (i.e. of Formula (17)). These polycarbonates, prior to cross-linking, can be provided as thermally stable high melt-flow polymers, and can thus be used to fabricate a variety of thin-walled products (e.g., 3 mm or less). These products may subsequently be treated (e.g., with UV-radiation) to affect cross-linking, thereby providing thin-walled materials that meet desired performance requirements (e.g., 5VA performance, chemical resistance, transparency). The cross-linked materials, in addition to flame resistance and chemical resistance, may retain or exhibit superior mechanical properties (e.g., impact resistance, ductility) as compared to the composition prior to cross-linking.

The dihydroxybenzophenone monomers of the cross-linkable polycarbonates provide a photoactive ketone group for cross-linking the polycarbonates. Treatment of a cross-linkable polycarbonate of the present disclosure with a suitable dose of UV radiation initiates a cross-linking reaction between the dihydroxybenzophenone carbonyl carbon and the carbon atom of another functional group (e.g., a methylene carbon atom, such as in bisphenol-A) in the same polymer or another polymer in the composition.

The cross-linkable polycarbonates of the present disclosure include homopolycarbonates, copolymers comprising different moieties in the carbonate (referred as "copolycarbonates"), copolymers comprising carbonate units and other types of polymer units such as polyester units, polysiloxane units, and combinations comprising at least one homopolycarbonate and copolycarbonate. For reference, the term "dipolymer" refers to copolymers derived specifically from two different monomers, and the term "terpolymer" refers to copolymers derived specifically from three different monomers If the cross-linkable polycarbonate is a copolymer, the monomers may be randomly incorporated into the polycarbonate. A random copolymer may have several block sequences and alternate sequences that follow a statistical distribution. In a random x:(1−x) copolymer, wherein x is the mole percent of a first monomer and 1−x is the mole percent of the other monomers, one can calculate the distribution of each monomer using peak area values determined by $^{13}C$ NMR, for example. The copolymer can be an alternating copolymer with alternating I and O units (—I—O—I—O—I—O—I—O—), or I and O units arranged in a repeating sequence (e.g. a periodic copolymer having the formula: (I—O—I—O—O—I—I—I—I—O—O—O)n). The cross-linkable polycarbonate copolymer may be a statistical copolymer in which the sequence of monomer residues follows a statistical rule. The copolymer may also be a block copolymer that comprises two or more homopolymer subunits linked by covalent bonds (—I—I—I—I—I—O—O—O—O—O —). The union of the homopolymer subunits may require an intermediate non-repeating subunit, known as a junction block. Block copolymers with two or three distinct blocks are called diblock copolymers and triblock copolymers, respectively.

In embodiments, the cross-linkable polycarbonates of the present disclosure contain from about 0.5 mole % to about 50 mole % of the dihydroxybenzophenone monomer (i.e. repeating units derived from the dihydroxybenzophenone monomer). In more specific embodiments, the polymers contain from about 1 mole % to about 3 mole %, or from about 1 mole % to about 6 mole %, from about 10 mole % to about 25 mole %, or from about 0.5 mole % to about 25 mole % of the dihydroxybenzophenone monomer.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure may have a weight average molecular weight (Mw) of 15,000 to about 80,000 Daltons [±1,000 Daltons], or of 15,000 to about 35,000 Daltons [±1,000 Daltons], or of about 20,000 to about 30,000 Daltons [±1,000 Daltons]. In certain embodiments, the cross-linkable polycarbonates have weight average molecular weights of about 16,000 Daltons [±1,000 Daltons], about 17,000 Daltons [±1,000 Daltons], about 18,000 Daltons [±1,000 Daltons], about 19,000 Daltons [±1,000 Daltons], about 20,000 Daltons [±1,000 Daltons], about 21,000 Daltons [±1,000 Daltons], about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], or about 35,000 Daltons [±1,000 Daltons]. In additional embodiments, the cross-linkable polycarbonates have a Mw of 17,000 to about 80,000 Daltons. Molecular weight determinations may be performed using gel permeation chromatography (GPC), using a cross-linked styrene-divinylbenzene column and calibrated to polycarbonate references using a UV-VIS detector set at 264 nm, or alternatively using a refractive index detector. Samples may be prepared at a concentration of about 1 mg/ml, and eluted at a flow rate of about 1.0 ml/min.

The cross-linkable polycarbonates of the present disclosure may have a polydispersity index (PDI) of about 2.0 to about 5.0, about 2.0 to about 3.0, or about 2.0 to about 2.5. The PDI is measured prior to any UV exposure.

It is noted that the molecular weight (both weight-average and number-average) of the photoactive additive/cross-linkable polycarbonate can be measured using two different kinds of detectors. More specifically, the molecular weight can be measured using an ultraviolet (UV) detector or using a refractive index (RI) detector, using GPC and calibrated to polycarbonate standards for both detectors.

In embodiments, the ratio of the polydispersity index (PDI) measured using a UV detector to the PDI measured using an RI detector is 1.4 or less, when using a GPC method and polycarbonate molecular weight standards. The ratio may also be 1.2 or less, or 1.1 or less.

The cross-linkable polycarbonates of the present disclosure may have a melt flow rate (often abbreviated MFR), which measures the rate of extrusion of a composition through an orifice at a prescribed temperature and load. In certain embodiments, the polycarbonates may have an MFR of 1 to 40 grams/10 min, 6 to 15 grams/10 min, 6 to 8 grams/10 min, 6 to 12 grams/10 min, 2 to 30 grams/10 min, 5 to 30 grams/10 min, 8 to 12 grams/10 min, 8 to 10 grams/10 min, or 20 to 30 grams/10 min, using the ASTM D1238 method, 1.2 kg load, 300° C. temperature, 360 second dwell.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure may have a biocontent of 2 wt % to 90 wt %; 5 wt % to 25 wt %; 10 wt % to 30 wt %; 15 wt % to 35 wt %; 20 wt % to 40 wt %; 25 wt % to 45 wt %; 30 wt % to 50 wt %; 35 wt % to 55 wt %; 40 wt % to 60 wt %; 45 wt % to 65 wt %; 55 wt % to 70% wt %; 60 wt % to 75 wt %; 50 wt % to 80 wt %; or 50 wt % to 90 wt %. The biocontent may be measured according to ASTM D6866.

The cross-linkable polycarbonates of the present disclosure may have a modulus of elasticity of greater than or equal to 2200 megapascals (MPa), greater than or equal to 2310 MPa, greater than or equal to 2320 MPa, greater than or equal to 2330 MPa, greater than or equal to 2340 MPa, greater than or equal to 2350 MPa, greater than or equal to 2360 MPa, greater than or equal to 2370 MPa, greater than or equal to 2380 MPa, greater than or equal to 2390 MPa, greater than or equal to 2400 MPa, greater than or equal to 2420 MPa, greater than or equal to 2440 MPa, greater than or equal to 2460 MPa, greater than or equal to 2480 MPa, greater than or equal to 2500 MPa, or greater than or equal to 2520 MPa as measured by ASTM D 790 at 1.3 mm/min, 50 mm span.

In embodiments, the cross-linkable polycarbonates of the present disclosure may have a flexural modulus of 2,200 to 2,500, preferably 2,250 to 2,450, more preferably 2,300 to 2,400 MPa. In other embodiments, the cross-linkable polycarbonates of the present disclosure may have a flexural modulus of 2,300 to 2,600, preferably 2,400 to 2,600, more preferably 2,450 to 2,550 MPa. The flexural modulus is also measured by ASTM D790.

The cross-linkable polycarbonates of the present disclosure may have a tensile strength at break of greater than or equal to 60 megapascals (MPa), greater than or equal to 61 MPa, greater than or equal to 62 MPa, greater than or equal to 63 MPa, greater than or equal to 64 MPa, greater than or equal to 65 MPa, greater than or equal to 66 MPa, greater than or equal to 67 MPa, greater than or equal to 68 MPa, greater than or equal to 69 MPa, greater than or equal to 70 MPa, greater than or equal to 71 MPa, greater than or equal to 72 MPa, greater than or equal to 73 MPa, greater than or equal to 74 MPa, greater than or equal to 75 MPa as measured by ASTM D 638 Type I at 50 mm/min.

The cross-linkable polycarbonates of the present disclosure may possess a ductility of greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D 256-10.

The cross-linkable polycarbonates of the present disclosure may have a notched Izod impact strength (NII) of greater than or equal to 500 J/m, greater than or equal to 550 J/m, greater than or equal to 600 J/m, greater than or equal to 650 J/m, greater than or equal to 700 J/m, greater than or equal to 750 J/m, greater than or equal to 800 J/m, greater than or equal to 850 J/m, greater than or equal to 900 J/m, greater than or equal to 950 J/m, or greater than or equal to 1000 J/m, measured at 23° C. according to ASTM D 256.

The cross-linkable polycarbonates of the present disclosure may have a heat distortion temperature of greater than or equal to 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D 648 at 1.82 MPa, with 3.2 mm thick unannealed mm bar.

The cross-linkable polycarbonates of the present disclosure may have a percent haze value of less than or equal to 10.0%, less than or equal to 8.0%, less than or equal to 6.0%, less than or equal to 5.0%, less than or equal to 4.0%, less than or equal to 3.0%, less than or equal to 2.0%, less than or equal to 1.5%, less than or equal to 1.0%, or less than or equal to 0.5% as measured at a certain thickness according to ASTM D 1003-07. The polycarbonate haze may be measured at a 2.0, 2.2, 2.4, 2.54, 2.6, 2.8, 3.0, 3.2, 3.4, 3.6, 3.8, or a 4.0 millimeter thickness. The polycarbonate may be measured at a 0.125 inch thickness.

The polycarbonate may have a light transmittance greater than or equal to 50%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 96%, greater than or equal to 97%, greater than or equal to 98%, greater than or equal to 99%, greater than or equal to 99.1%, greater than or equal to 99.2%, greater than or equal to 99.3%, greater than or equal to 99.4%, greater than or equal to 99.5%, greater than or equal to 99.6%, greater than or equal to 99.7%, greater than or equal to 99.8%, or greater than or equal to 99.9%, as measured at certain thicknesses according to ASTM D 1003-07. The polycarbonate transparency may be measured at a 2.0, 2.2, 2.4, 2.6, 2.8, 3.0, 3.2, 3.4, 3.6, 3.8, or a 4.0 millimeter thickness.

In certain embodiments, the cross-linkable polycarbonates of the present disclosure do not include soft block or soft aliphatic segments in the polycarbonate chain. For example, the following aliphatic soft segments that may be excluded from the cross-linkable polycarbonates of the present disclosure include aliphatic polyesters, aliphatic polyethers, aliphatic polythioethers, aliphatic polyacetals, aliphatic polycarbonates, C—C linked polymers and polysiloxanes. The soft segments of aliphatic polyesters, aliphatic polyethers, aliphatic polythioethers, aliphatic polyacetals, aliphatic polycarbonates may be characterized as having Number Average MWs (Mns) of greater than 600.

In particular embodiments, the photoactive cross-linkable polycarbonate resin is formed from a dihydroxybenzophenone, a diol chain extender, phosgene, and one or more end-capping agents. Most desirably, the dihydroxybenzophenone is 4,4'-dihydroxybenzophenone. In preferred embodiments, the diol chain extender is bisphenol-A, and the end-capping agent is p-cumylphenol. The resulting photoactive additive (i.e. cross-linkable polycarbonate resin) comprises from about 0.5 mol % to 25 mole % repeating units derived from the dihydroxybenzophenone. In more particular embodiments, the photoactive additive comprises from about 1 wt % to about 5 mole %, or from about 5 wt % to about 20 wt %, or from about 10 wt % to about 20 wt %, of the dihydroxybenzophenone.

In particular embodiments, the cross-linkable polycarbonate is a copolymer consisting of repeating units derived from 4,4'-dihydroxybenzophenone and bisphenol-A, with end-caps that are not photoactive. The copolymer contains from about 0.5 mol % to 25 mole % repeating units derived from the dihydroxybenzophenone, and from about 75 mol % to 99.5 mole % repeating units derived from the bisphenol-A.

Processes

An interfacial polycondensation polymerization process for bisphenol-A (BPA) based polycarbonates can be used to prepare the photoactive additives (PAAs) of the present disclosure. Although the reaction conditions for interfacial polymerization can vary, an exemplary process generally involves dissolving or dispersing one or more dihydric phenol reactants (e.g. the dihydroxybenzophenone, bisphenol-A) in water, adding the resulting mixture to a water-immiscible solvent medium, and contacting the reactants with a carbonate precursor (e.g. phosgene) in the presence of a catalyst (e.g. triethylamine, TEA).

The processes described herein typically produce polycarbonates with a polydispersity index (PDI) of less than 3. A higher PDI can indicate an increased low molecular weight fraction in the product, which can lead to difficulties in extrusion and injection molding processes by altering the flow behavior or causing the low molecular weight components to volatilize out of the material.

Four different processes are disclosed herein for producing some embodiments of the photoactive additive which contain carbonate linkages. Each process includes the following ingredients: a dihydroxybenzophenone, a diol chain extender, an end-capping agent, a carbonate precursor, a base, a tertiary amine catalyst, water, and a water-immiscible organic solvent, and optionally a branching agent. The dihydroxybenzophenone is the photoactive moiety. It should be noted that more than one of each ingredient can be used to produce the photoactive additive. Many of these ingredients have been previously described.

The carbonate precursor may be, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, diacid chloride, or any combination thereof. An interfacial polymerization reaction to form carbonate linkages may use phosgene as a carbonate precursor, and is referred to as a phosgenation reaction. Many such carbonate precursors correspond to a structure of Formulas (30), (32), or (33).

The base is used for the regulation of the pH of the reaction mixture. In particular embodiments, the base is an alkali metal hydroxide, such as sodium hydroxide (NaOH) or potassium hydroxide (KOH).

A tertiary amine catalyst is used for polymerization. Exemplary tertiary amine catalysts that can be used are aliphatic tertiary amines such as triethylamine (TEA), N-ethylpiperidine, 1,4-diazabicyclo[2.2.2]octane (DABCO), tributylamine, cycloaliphatic amines such as N,N-diethyl-cyclohexylamine and aromatic tertiary amines such as N,N-dimethylaniline.

Sometimes, a phase transfer catalyst is also used. Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl−, Br−, a $C_1$-$C_8$ alkoxy group or a $C_6$-$C_{18}$ aryloxy group, such as methyltributylammonium chloride.

The most commonly used water-immiscible solvents include methylene chloride, 1,2-dichloroethane, chlorobenzene, toluene, and the like.

In the first process, sometimes referred to as the "upfront" process, the dihydroxybenzophenone, diol chain extender, end-capping agent, catalyst, water, and water-immiscible solvent are combined upfront in a vessel to form a reaction mixture. The reaction mixture is then exposed to the carbonate precursor, for example by phosgenation, while the base is co-added to regulate the reaction pH, to obtain the photoactive additive.

In the second process, also known as the "solution addition" process, the dihydroxybenzophenone, diol chain extender, tertiary amine catalyst, water, and water-immiscible solvent are combined in a vessel to form a reaction mixture. The total charge of the carbonate precursor is then added to this reaction mixture in the vessel over a total time period of about 15 minutes to about 45 minutes, while the base is co-added to regulate the pH. The carbonate precursor is first added to the reaction mixture along with the base to regulate the pH for a first time period that ranges from about 2 minutes to about 20 minutes. After the first time period ends, the end-capping agent is added in a controlled manner to the reaction mixture, also referred to as programmed addition. The addition of the end-capping agent occurs for a second time period after the first time period, rather than as a bolus at the beginning of the reaction (as in the upfront process). The carbonate precursor and the base are also added concurrently with the end-capping agent during the second time period. After the second time period ends, the remainder of the carbonate precursor continues uninterrupted for a third time period until the total charge is reached. The base is also co-added during the third time period to regulate the reaction pH. The end-capping agent is not added during either the first time period or the third time period. The photoactive additive is thus obtained. The total time period for the reaction is the sum of the first time period, the second time period, and the third time period. In particular embodiments, the second time period in which the solution containing the end-capping agent is added to the reaction mixture begins at a point between 10% to about 40% of the total time period. Put another way, the first time period is 10% of the total time period.

The third process is also referred to as a bis-chloroformate or chloroformate (BCF) process. Chloroformate oligomers are prepared by reacting the carbonate precursor, specifically phosgene, with the dihydroxybenzophenone and the diol chain extender in the absence of the tertiary amine catalyst, while the base is co-added to regulate the pH. The chloroformate oligomers can contain a mixture of monochloroformates, bischloroformates, and bisphenol terminated oligomers. After the chloroformate oligomers are generated, the phosgene can optionally be allowed to substantially condense or hydrolyze, then the end-capping agent is added to the chloroformate mixture. The reaction is allowed to proceed, and the tertiary amine catalyst is added to complete the reaction.

The fourth process uses a tubular reactor. In the tubular reactor, the end-capping agent is pre-reacted with the carbonate precursor (specifically phosgene) to form chloroformates. The water-immiscible solvent is used as a solvent in the tubular reactor. In a separate reactor, the dihydroxybenzophenone, diol chain extender, tertiary amine catalyst, water, and water-immiscible solvent are combined to form a reaction mixture. The chloroformates in the tubular reactor are then fed into the reactor over a first time period along with additional carbonate precursor to complete the reaction while the base is co-added to regulate the pH.

The resulting photoactive additive (e.g. the cross-linkable polycarbonate) contains only a small amount of low-molecular-weight components. This can be measured in two different ways: the level of diarylcarbonates (DAC) and the lows percentage can be measured. Diarylcarbonates are formed by the reaction of two end-capping agents with phosgene, creating a small molecule that contains no dihydroxybenzophenone or diol chain extender (e.g. bisphenol-A). In embodiments, the resulting photoactive additive contains less than 1000 ppm of diarylcarbonates. The lows percentage is the percentage by weight of oligomeric chains having a molecular weight of less than 1000. In embodiments, the lows percentage is 2.0 wt % or less, including from about 1.0 wt % to 2.0 wt %. The DAC level and the lows percentage can be measured by high performance liquid chromatography (HPLC) or gel permeation chromatography (GPC). Also of note is that the resulting photoactive additive does not contain any residual pyridine, because pyridine is not used in the manufacture of the photoactive additive.

Second Polymer Resin

The photoactive additives described above are blended with a polymeric base resin that is different from the photoactive additive, i.e. a second polymer resin, to form the blends of the present disclosure. More specifically, the second polymer resin does not contain photoactive groups. In embodiments, the weight ratio of the photoactive additive to the polymeric base resin is from 1:99 to 99:1, including from about 50:50 to about 85:15, or from about 10:90 to about 15:85, or from about 25:75 to about 50:50. The polymeric base resin has, in specific embodiments, a weight-average molecular weight of about 21,000 or greater, including from about 21,000 to about 40,000.

The blends may be subjected to cross-linking conditions (e.g., UV-radiation) to affect cross-linking of the photoactive additives in the blend. Accordingly, blend compositions of the present disclosure include blends prior to and after cross-linking.

The blends may comprise one or more distinct cross-linkable polycarbonates, as described herein, and/or one or more cross-linked polycarbonates, as described herein, as the photoactive additive. The blends also comprise one or more additional polymers. The blends may comprise additional components, such as one or more additives. In certain embodiments, a blend comprises a cross-linkable and/or cross-linked polycarbonate (Polymer A) and a second polymer (Polymer B), and optionally one or more additives. In another embodiment, a blend comprises a combination of a cross-linkable and/or cross-linked polycarbonate (Polymer A); and a second polycarbonate (Polymer B), wherein the second polycarbonate is different from the first polycarbonate.

In a preferred embodiment, the blend compositions disclosed herein comprise a flame-retardant, a flame retardant additive, and/or an impact modifier. The flame-retardant may be potassium perfluorobutane sulfonate (Rimar salt), potassium diphenyl sulfone-3-sulfonate (KSS), or a combination thereof.

The second polymer (Polymer B) may be any polymer different from the first polymer that is suitable for use in a blend composition. In certain embodiments, the second polymer may be a polyester, a polyestercarbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In certain embodiments, the second polymer may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In certain embodiments, the second polymer may be a homopolycarbonate, a copolycarbonate, a polycarbonate-polysiloxane copolymer, a polyester-polycarbonate, or any combination thereof. In certain embodiments, the second polycarbonate is a p-cumyl phenol capped poly(isophthalate-terephthalate-resorcinol ester)-co-(bisphenol-A carbonate) copolymer. In certain embodiments, the second polycarbonate is a polycarbonate-polysiloxane copolymer.

The p-cumyl phenol capped poly(isophthalate-terephthalate-resorcinol ester)-co-(bisphenol-A carbonate) polymer or a polycarbonate-polysiloxane copolymer may have a polysiloxane content from 0.4 wt % to 25 wt %. In one preferred embodiment, the second polymer is a p-cumylphenol capped poly (19 mol % isophthalate-terephthalate-resorcinol ester)-co-(75 mol % bisphenol-A carbonate)-co-(6 mol % resorcinol carbonate) copolymer (MW=29,000 Daltons). In another preferred embodiment, the second polymer is a p-cumylphenol capped poly(10 wt % isophthalate-terephthalate-resorcinol ester)-co-(87 wt % bisphenol-A carbonate)-co-(3 mol % resorcinol carbonate) copolymer (MW=29,000 Daltons).

In another preferred embodiment, the second polymer is a polycarbonate polysiloxane copolymer. The polycarbonate-polysiloxane copolymer may be a siloxane block co-polycarbonate comprising from about 6 wt % siloxane (±10%) to about 20 wt % siloxane (±10%), and having a siloxane chain length of 10 to 200. In another preferred embodiment, the second polymer is a PC-siloxane copolymer with 20% siloxane segments by weight. In another preferred embodiment, the second polymer is a p-cumylphenol capped poly (65 mol % BPA carbonate)-co-(35 mol % 3,3-bis(4-hydroxyphenyl)-2-phenylisoindolin-1-one (PP-PBP) carbonate) copolymer (MW=25,000 Daltons).

In another preferred embodiment, the second polymer is a polyphosphonate polymer, a polyphosphonate copolymer, or a poly(polyphosphonate)-co-(BPA carbonate) copolymer.

In yet other embodiments, the polymer resin in the blend is selected from the group consisting of a polycarbonate-polysiloxane copolymer; a polycarbonate resin having an aliphatic chain containing at least two carbon atoms as a repeating unit in the polymer backbone; a copolyester polymer; a bisphenol-A homopolycarbonate; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; a dimethyl bisphenol cyclohexane-co-bisphenol-A copolymer; a polyetherimide; a polyethersulfone; and a copolycarbonate of bisphenol-A and 1,1-bis(4-hydroxyphenyl)-3,3,5-trimethylcyclohexane) (BPTMC).

In particular embodiments, the polymer resin in the blend is a polycarbonate-polysiloxane (PC-Si) copolymer. The polycarbonate units of the copolymer are derived from dihydroxy compounds having the structures of any of the formulas described above, but particularly those of the chain extenders of Formulas (B) and (C) when Z is hydroxyl. Some illustrative examples of suitable dihydroxy compounds include the following: 1,1-bis(4-hydroxyphenyl) methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl) propane; resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone. Bisphenol-A is often part of the PC-Si copolymer.

The polysiloxane blocks of the copolymer can be derived from siloxane-containing dihydroxy monomers. One exemplary siloxane monomer has the structure of Formula (D-1):

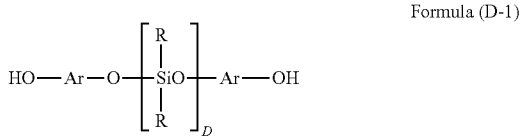

Formula (D-1)

wherein each Ar is independently aryl; each R is independently alkyl, alkoxy, alkenyl, alkenyloxy, aryl, aryloxy, arylalkyl, or alkylaryl; and D is an average value of 2 to about 1000, specifically about 2 to about 500, more specifically about 10 to about 75. Compounds of this formula may be obtained by the reaction of a dihydroxyaromatic compound with, for example, an alpha, omega-bis-acetoxy-polydiorganosiloxane under phase transfer conditions.

Another exemplary siloxane monomer has the structure of Formula (D-3):

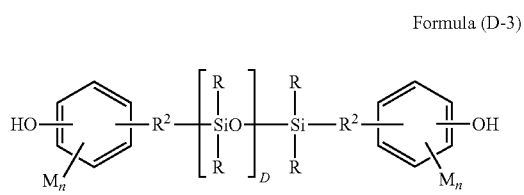

Formula (D-3)

wherein each R is independently alkyl, alkoxy, alkenyl, alkenyloxy, aryl, aryloxy, arylalkyl, or alkylaryl; and D is an average value of 2 to about 1000, specifically about 2 to about 500, more specifically about 10 to about 75; each M is independently cyano, nitro, alkyl, alkoxy, alkenyl, alkenyloxy, aryl, aryloxy, arylalkyl, or alkylaryl; each n is independently an integer from 0 to 4; and each $R_2$ is independently an aliphatic group. Compounds of this formula may be obtained by the reaction of a siloxane hydride with an aliphatically unsaturated monohydric phenol. Suitable aliphatically unsaturated monohydric phenols include, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

The polymer resin (polymer B) in the blend can be a polycarbonate resin having an aliphatic chain containing at least two carbon atoms as a repeating unit in the polymer backbone. This resin can also be considered a "soft segment polycarbonate" (SSP) resin. Generally speaking, the SSP resin is a copolymer of an aromatic difunctional compound and an aliphatic difunctional compound. The aromatic difunctional compound may have the structure of, for example, any of Formulas (B)-(J), previously described as chain extenders above. In specific embodiments, the aromatic difunctional compound is a bisphenol of Formula (B). The aliphatic difunctional compound provides a long aliphatic chain in the backbone and may have the structure of Formula (E). Exemplary aliphatic diols that are useful in SSP resins include adipic acid (n=4), sebacic acid (n=8), and dodecanedioic acid (n=10).

The SSP resin can be formed, for example by the phosgenation of bisphenol-A, sebacic acid, and p-cumyl phenol. The SSP resin contains carbonate linkages and ester linkages.

In this regard, it is believed that the crosslinking reaction rate of the photoactive additive and its yield are directly related to the hydrogen-to-ketone ratio of the polymeric blend. Thus, the higher the hydrogen-to-ketone ratio of the blend, the higher the rate of chain-extension reaction/crosslinking should be. Due to the presence of the hydrogen-rich SSP resin with its aliphatic blocks, the hydrogen-to-ketone ratio is relatively high. As a result, the crosslinking density and the resulting flame retardance and chemical resistance should be very good for this blend. In addition, the SSP resin has very good flow properties. It is believed that the blend should also have good flow, and should also retain its ductile properties even after crosslinking.

The polymer resin (polymer B) in the blend can be a copolyester polymer or a polybutylene terephthalate (PBT) polymer. Copolyester resins are commercially available, for example under the TRITAN brand from Eastman Chemical Company. PBT resins are commercially available, for example from SABIC Innovative Plastics under the brand name VALOX.

The polymer resin (polymer B) in the blend can be a bisphenol-A homopolycarbonate. Such resins are available, for example as LEXAN from SABIC Innovative Plastics.

The polymer resin (polymer B) in the blend can be a polystyrene polymer. Such polymers contain only polystyrene monomers. Thus, for example ABS and MBS should not be considered polystyrene polymers.

The polymer resin (polymer B) in the blend can be a thermoplastic polyester. An exemplary polyester is PCTG, which is a copolymer derived from the reaction of terephthalic acid, ethylene glycol, and cyclohexanedimethanol (CHDM). The PCTG copolymer can contain 40-90 mole % CHDM, with the terephthalic acid and the ethylene glycol making up the remaining 10-60 mole %.

The polymer resin (polymer B) in the blend can be a dimethyl bisphenol cyclohexane-co-bisphenol-A copolymer, i.e. a DMBPC-BPA copolymer. This copolymer is illustrated below:

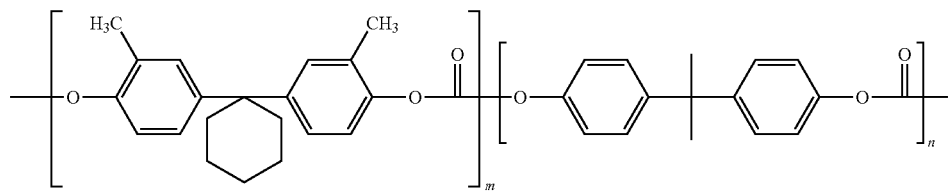

wherein the molar ratio of DMBPC to BPA is m:n. Again, this notation is intended to report the relative molar amounts between the DMBPC units and the BPA units, and should not be construed as denoting the structure of the copolymer (i.e. these two units are randomly distributed and are not blocks). The DMBPC is usually from 20 mole % to 90 mole % of the copolymer, including 25 mole % to 60 mole %. The BPA is usually from 10 mole % to 80 mole % of the copolymer, including 40 mole % to 75 mole %. These resins have high scratch resistance.

Other Additives

Other conventional additives can also be added to the blend (e.g. flame retardants, heat stabilizers, impact modifiers, UV stabilizing additives, mold release agents, colorants, organic and inorganic fillers, gamma-stabilizing agents, etc.).

Various types of flame retardants can be utilized as additives. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In certain embodiments, the flame retardant does not contain bromine or chlorine.

The flame retardant optionally is a non-halogen based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium and barium. Examples of flame retardants include cesium benzenesulfonate and cesium p-toluenesulfonate. See e.g., U.S. Pat. No. 3,933,734, EP 2103654, and US2010/0069543A1, the disclosures of which are incorporated herein by reference in their entirety.

Another useful class of flame retardant is the class of cyclic siloxanes having the general formula [(R)$_2$SiO]$_y$, wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like; phosphates such as trimethyl phosphate, or the like; or combinations comprising at least one of the foregoing heat stabilizers. Heat stabilizers are generally used in amounts of 0.0001 to 1 part by weight, based on 100 parts by weight of the polymer component of the polymeric blend/composition.

Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the polymeric blend/composition.

The polymeric blend can improve the chemical resistance of the final product. It is contemplated that products can be of any desired shape (e.g. film, sheet, etc.) and be used in many different applications, for example in the medical, automotive, and consumer electronics fields. Increased chemical resistance may be found against 409 Glass and Surface Cleaner; Alcohol Prep Pad; CaviCide liquid/CaviWipes; CaviWipes; Cidex Plus liquid; Clorox Bleach; Clorox Wipes; Envirocide liquid; For Pro liquid; Gentle dish soap and water; Hydrogen Peroxide Cleaner Disinfectant Wipes; Isopropyl Alcohol wipes; MadaCide-1 liquid; Mar-V-Cide liquid to dilute; Sani-Cloth Bleach Wipes; Sani-Cloth HB Wipes; Sani-Cloth Plus Wipes; Sodium Hypochlorite liquid; Super Sani-Cloth Wipes; Viraguard liquid and Wipes; Virex 256; Windex Blue; Fuel C; Toluene; Heptane; Ethanol; Isopropanol; Windex; Engine oil; WD40; Transmission fluid; Break fluid; Glass wash; Diesel; Gasoline; Banana Boat Sunscreen (SPF 30); Sebum; Ivory Dish Soap; SC Johnson Fantastik Cleaner; French's Yellow Mustard; Coca-Cola; 70% Isopropyl Alcohol; Extra Virgin Olive Oil; Vaseline Intensive Care Hand Lotion; Heinz Ketchup; Kraft Mayonnaise; Chlorox Formula 409 Cleaner; SC Johnson Windex Cleaner with Ammonia; Acetone; Artificial Sweat; Fruits & Passion Cucina Coriander & Olive Hand Cream; Loreal Studioline Megagel Hair Gel; Maybelline Lip Polish; Maybelline Expert Wear Blush—Beach Plum Rouge; Purell Hand Sanitizer; Hot coffee, black; iKlear; Chlorox Wipes; Squalene; Palmitic Acid; Oleic Acid; Palmitoleic Acid; Stearic Acid; and Olive Oil.

Products

Compositions/blends disclosed herein, preferably prior to cross-linking, may be formed, shaped, molded, injection molded, or extruded into a product, particularly thin-walled products, including highly transparent thin-walled products, having improved flame retardance and good physical properties.

The blend can be extruded into pellets, then molded or extruded into products. The product can then be irradiated with UV light to create crosslinks between the chains, resulting in improved flame retardance and chemical resistance. Use of a PC-Si copolymer provides good impact strength and ductility at low temperatures, and it is believed that the blend will retain these properties even after cross-linking.

The compositions/blends can be molded into useful shaped products by a variety of means such as injection molding, overmolding, co-injection molding, extrusion, multilayer extrusion, rotational molding, blow molding and thermoforming to form products. The formed products may be subsequently subjected to cross-linking conditions (e.g., UV-radiation) to affect cross-linking of the polycarbonates.

The compositions can be used to provide materials and products such as, but not limited to, injection molded articles, films, extruded sheets, fibers, pellets, flex-films, tear-resistant films, and PVD laminates.

Products that may be formed from the compositions/blends include various components for cell phones and cell phone covers, components for computer housings, computer housings and business machine housings and parts such as housings and parts for monitors, computer routers, copiers, desk top printers, large office/industrial printers handheld electronic device housings such as computer or business machine housings, housings for hand-held devices, components for light fixtures or home or office appliances, humidifier housings, thermostat control housings air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, components for interior or exterior components of an automobile, lenses (auto and non-auto) such as components for film applications, greenhouse components, sun room components, fire helmets, safety shields, safety goggles, glasses with impact resistance, fendors, gas pumps, films for televisions, such as ecofriendly films having no halogen content, solar application materials, glass lamination materials, fibers for glass-filled systems, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, turbine blades (e.g., wind turbines), and the like.

In certain embodiments, products that may comprise the composition/blend include automotive bumpers, other automotive, construction and agricultural equipment exterior components, automobile mirror housings, an automobile grille, an automobile pillar, automobile wheel covers, automobile, construction and agricultural equipment instrument panels and trim, construction and agricultural grilles, automobile glove boxes, automobile door hardware and other interior trim, automobile construction and agricultural equipment exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, lighting parts, dental instruments and equipment, medical instruments, cookware, medical instrument trays, animal cages, fibers, laser welded medical devices, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and fiber optics.

In certain embodiments, products that may comprise the composition/blend include automotive bumpers, other automotive exterior components, automobile mirror housings, an automobile grille, an automobile pillar, automobile wheel covers, automobile instrument panels and trim, automobile glove boxes, automobile door hardware and other interior trim, external automobile trim parts, such as pillars, automobile exterior lights, automobile parts within the engine compartment, an agricultural tractor or device part, a construction equipment vehicle or device part, a construction or agricultural equipment grille, a marine or personal water craft part, an all terrain vehicle or all terrain vehicle part, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, electric enclosures, lighting parts, dental instruments, medical instruments, medical or dental lighting parts, an aircraft part, a train or rail part, a seating component, sidewalls, ceiling parts, cookware, medical instrument trays, animal cages, fibers, laser welded medical devices, fiber optics, lenses (auto and non-auto), cell phone parts, greenhouse components, sun room components, fire helmets, safety shields, safety glasses, gas pump parts, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and turbine blades.

In certain embodiments, the product is one that requires or must include a material having a UL94 5VA rating performance. Products that require a UL94 5VA rating include, but are not limited to, computer housings, computer housings and business machine housings and parts such as housings and parts for monitors, computer routers, copiers, desk top printers, large office/industrial printers, handheld electronic device housings such as computer or business machine housings, housings for hand-held devices, components for light fixtures including LED fixtures or home or office appliances, humidifier housings, thermostat control housings, air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, electrical boxes and enclosures, and electrical connectors.

In certain embodiments, the product is one that requires hydrothermal stability, such as a wind turbine blade, a steam sterilizable medical device, a food service tray, utensils and equipment.

In certain embodiments, the product is one that requires a combination of transparency, flame resistance, and/or impact resistance. For example, in certain embodiments the product may be a safety shield, safety goggles, a gas/fuel pump housing, a display window or part, or the like.

Method of Making the Products

The product may be produced by a manufacturing process. The process may comprise the steps of (a) providing a blend as described above, containing a photoactive additive. The blend from step (a) may then be (b) melted, for example, at 200-400° C., 225-350° C., 250-310° C., or 270-300° C. in an extruder. The melted blend of step (b) may then be (c) extruded, and (d) the blend may be isolated or chopped. The product of manufacture may further be produced by the step of (e) drying the blend and (f) melt forming the blend. The product may then be subjected to cross-linking conditions, as described herein, so as to affect cross-linking of the photoactive additive. In certain embodiments, the product is not subjected to cross-linking conditions immediately after manufacture, but rather is cross-linked at a later time, such as when the product is introduced to sun light.

The photoactive additive (PAA) can be blended with one or more polymeric base resins by melt blending or solution blending to form a polymeric composition/blend. The PAA-containing blend can be then be formed into a product by a variety of known processes such as solution casting, profile extrusion, film and/or sheet extrusion, sheet-foam extrusion, injection molding, blow molding, thermoforming, and the like. The product is then exposed to ultraviolet (UV) light at an appropriate wavelength and in an appropriate dosage that brings about the desired amount of crosslinking for the given application. Depending on the end use application and the desired properties, the UV exposure can be performed on one or more surfaces of the product.

The product where the enhanced properties are needed should be exposed with a substantially uniform dose of UV light. The exposure can be accomplished using standard methods known in the art. For example, the UV light can come from any source of UV light such as, but not limited to, those lamps powered by microwave, HID lamps, and mercury vapor lamps. In some other embodiments, the product is exposed by using natural sunlight. The exposure time will be dependent on the application and color of material. It can range from a few minutes to several days. Alternatively, the crosslinking can be accomplished by using a UV-emitting light source such as a mercury vapor, High-Intensity Discharge (HID), or various UV lamps. For example, commercial UV lamps are sold for UV curing from manufacturers such as Hereaus Noblelight Fusion UV. Non-limiting examples of UV-emitting light bulbs include mercury bulbs (H bulbs), or metal halide doped mercury bulbs (D bulbs, H+ bulbs, and V bulbs). Other combinations of metal halides to create a UV light source are also contemplated. Exemplary bulbs could also be produced by assembling the lamp out of UV-absorbing materials and considered as a filtered UV source. An undoped mercury arc lamp is not used for irradiation. An H bulb has strong output in the range of 200 nm to 320 nm. The D bulb has strong output in the 320 nm to 400 nm range. The V bulb has strong output in the 400 nm to 420 nm range.

It may also be advantageous to use a UV light source where the harmful wavelengths (those that cause polymer degradation or excessive yellowing) are removed or not present. Equipment suppliers such as Heraeus Noblelight Fusion UV provide lamps with various spectral distributions. The light can also be filtered to remove harmful or unwanted wavelengths of light. This can be done with optical filters that are used to selectively transmit or reject a wavelength or range of wavelengths. These filters are commercially available from a variety of companies such as Edmund Optics or Praezisions Glas & Optik GmbH. Band-pass filters are designed to transmit a portion of the spectrum, while rejecting all other wavelengths. Longpass edge filters are designed to transmit wavelengths greater than the cut-on wavelength of the filter. Shortpass edge filters are used to transmit wavelengths shorter than the cut-off wavelength of the filter. Various types of materials, such as borosilicate glass, can be used as a long pass filter. Schott and/or Praezisions Glas & Optik GmbH for example have the following long pass filters: WG225, WG280, WG295, WG305, WG320 which have cut-on wavelengths of ~225, 280, 295, 305, and 320 nm, respectively. These filters can be used to screen out the harmful short wavelengths while transmitting the appropriate wavelengths for the crosslinking reaction.

UV wavelengths can be separated into four different categories. UVA refers to wavelengths from 320 nm to 390 nm. UVB refers to wavelengths from 280 nm to 320 nm. UVC refers to wavelengths from 250 nm to 260 nm. UVV refers to wavelengths from 395 nm to 445 nm. In some embodiments, the UV radiation is filtered to provide no detectable UVC radiation, as measured using an EIT PowerPuck.

In particular embodiments, the product is exposed to a selected UV light range having wavelengths from about 280 nanometers (nm) to about 380 nm, or from about 330 nm to about 380 nm, or from about 280 nm to about 360 nm, or from about 330 nm to about 360 nm. The wavelengths in a "selected" light range have an internal transmittance of greater than 50%, with wavelengths outside of the range having an internal transmittance of less than 50%. The change in transmittance may occur over a range of 20 nm. Reference to a selected light range should not be construed as saying that all wavelengths within the range transmit at 100%, or that all wavelengths outside the range transmit at 0%.

The exposed product will have a cross-linked outer surface and an inner surface that is either lightly cross-linked or not cross-linked. The outer surface can be cross-linked to such a degree that the outer surface is substantially insoluble in the common solvents for the starting resins. The percentage of the insolubles (insoluble component) will be dependent on the part geometry and surface-to-volume ratio.

The following examples are provided to illustrate the polymeric blends, products, processes and properties of the present disclosure. The examples are merely illustrative and are not intended to limit the disclosure to the materials, conditions, or process parameters set forth therein.

EXAMPLES

All solvents and reagents used were analytical grade.

Molecular weight determinations were performed using gel permeation chromatography (GPC), using a cross-linked styrene-divinylbenzene column and calibrated to polycarbonate references using a UV-VIS detector set at 264 nm. Samples were prepared at a concentration of about 1 mg/ml, and eluted at a flow rate of about 1.0 ml/min. Optionally, a refractive index (RI) detector can be used. The percentage change in the molecular weight was calculated as the change divided by the molecular weight before UV exposure.

Differential scanning calorimetry (DSC) employing a temperature sweep rate of 20° C./min was used to determine glass transition temperatures of polycarbonates.

Flammability testing was conducted using the standard Underwriters Laboratory UL 94 test method (2 day or 7 day conditioning), except that 20 bars rather than the usual 5 bars were tested. Specimens are to be preconditioned either at room temperature for 48 hours or in an air-circulating oven for 168 hours at 70±1° C. and then cooled in a desiccator for at least 4 hours at room temperature, prior to testing. Once removed from the desiccator, specimens are tested within 30 minutes.

Flammability tests were performed following the procedure of Underwriter's Laboratory Bulletin 94 entitled "Tests for Flammability of Plastic Materials, UL94". Several ratings can be applied based on the rate of burning, time to extinguish, ability to resist dripping, and whether or not drips are burning. According to this procedure, materials may be classified as HB, V0, V1, V2, 5V, 5VA and/or 5VB on the basis of the test results obtained for five samples. The criteria for the flammability classifications or "flame retardance" are described below.

V0: A specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

To achieve a V0 rating, specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame 5VA: Testing is done on both bar and plaque specimens. Procedure for Bars: A bar specimen is supported in a vertical position and a flame is applied to one of the lower corners of the specimen at a 20° angle. The flame is applied for 5 seconds and is removed for 5 seconds. The flame application and removal is repeated five times. Procedure for Plaques: The procedure for plaques is the same as for bars except that the plaque specimen is mounted horizontally and a flame is applied to the center of the lower surface of the plaque.

To achieve a 5VA rating, specimens must not have any flaming or glowing combustion for more than 60 seconds after the five flame applications. Specimens must not drip flaming particles that ignite the cotton. Plaque specimens must not exhibit burnthrough (a hole). It is noted that in the Examples and Tables below, the rows that state whether 5VA was "Pass" or "Fail" for a given thickness refer only to whether the plaque test was passed, and should not be interpreted as stating that no combustion occurred for more than 60 seconds and that there were no drips. Results for both 2-day and 7-day conditioning are reported.

The data was analyzed by calculation of the average flame out time, standard deviation of the flame out time and the total number of drips. Statistical methods were used to convert the data to a probability that a specific formulation would achieve a first time V0 pass or "p(FTP)" in the standard UL 94 testing of 5 bars. The probability of a first time pass on a first submission (pFTP) may be determined according to the formula:

$$\text{pFTP} = (P_{t1>mbt,\ n=0} \times P_{t2>mbt,\ n=0} \times P_{total<=mbt} \times P_{drip,\ n=0})$$

where $P_{t1>mbt,\ n=0}$ is the probability that no first burn time exceeds a maximum burn time value, $P_{t2>mbt,\ n=0}$ is P the probability that no second burn time exceeds a maximum burn time value, $P_{total<=mbt}$ is P the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula: $P_{t1>mbt,\ n=0} = (1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt,\ n=0} = (1-P_{t2>mbt})$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip,\ n=0}$ that no specimen exhibits dripping during the flame test is an attribute function, estimated by: $(1-P_{drip})^5$ where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mbt}$ may be determined from the area under a log normal distribution curve of a set of 1000 Monte Carlo simulated 5-bar total burn time for total<=maximum total burn time. For the UL94 V0 rating, the maximum total burn time is 50 seconds. For a V1 rating, the maximum total burn time is 250 seconds.

Preferably p(FTP) values will be 1 or very close to 1 for high confidence that a sample formulation would achieve a V0 rating in UL 94 testing.

Cross-linked polycarbonate samples were evaluated for chemical resistance under strain conditions. A tensile bar of 3.2 mm thickness was positioned in a strain jig, so that the curvature of the jig induced a 0.5% or 1% stress level on the tensile bar. A portion of the bar was exposed to a solvent by dripping the solvent on top of the tensile bars. The bar was then allowed to sit on the jig for 24 hours, during which time the solvent evaporated. They were then removed from the strain jigs and the % elongation at break was measured following the ASTM D638 Type I method at 50 mm/min.

Samples were sometimes exposed to various doses of either filtered or unfiltered UV light. The unfiltered light was provided by a Fusion UV system, which used a D-bulb electrodeless bulb. The filtered light was provided by a Loctite Zeta 7411-S system, which used a 400 W metal halide arc lamp and behaved like a D-bulb electrodeless bulb in spectral output with a 280-nm cut-on wavelength filter. The samples were exposed on both sides beneath the UV lights for the equivalent UVA dosage of 12, 36, or 60 J/cm$^2$ per side. The UV energy (per pass or dose) for each system is provided below in Table A and Table B, and was measured using an EIT PowerPuck. The dose was measured as the energy from 320-390 nm (UVA), 280-320 nm (UVB), 250-260 nm (UVC) and 395-445 nm (UVV). The dose was calculated in J/cm$^2$.

TABLE A

Loctite (filtered light).

| Filtered | Loctite Dose | | | |
| --- | --- | --- | --- | --- |
| | UVA J/cm$^2$ | UVB J/cm$^2$ | UVC J/cm$^2$ | UVV J/cm$^2$ |
| 320 sec exposure | 12.0 | 2.4 | 0 | 7.3 |
| 960 sec exposure | 36.0 | 7.2 | 0 | 21.9 |
| 1600 sec exposure | 60.2 | 12.1 | 0 | 36.6 |

TABLE B

Fusion (unfiltered light)

| Unfiltered | Fusion UV | | | |
| --- | --- | --- | --- | --- |
| | UVA J/cm$^2$ | UVB J/cm$^2$ | UVC J/cm$^2$ | UVV J/cm$^2$ |
| 2 passes | 12.0 | 3.7 | 0.45 | 5.8 |
| 6 passes | 35.9 | 11.0 | 1.34 | 17.5 |
| 10 passes | 59.9 | 18.3 | 2.24 | 29.2 |

The Yellowness Index (YI) was measured on 3.2 mm tensile bars before UV exposure and at least 48 hours after UV exposure using an X-Rite Color i7 benchtop spectrophotometer in the transmission mode using CIELAB color equation, an observer angle of 2 degrees, and illuminant C as the light source. YI was measured following ASTM E313-73 (D1925).

The MFR for each sample was calculated using the ASTM D1238 method, 1.2 kg load, 300° C. temperature, 360 second dwell.

The various examples may contain the components shown in Table C.

TABLE C

| Component | Description | Trade name, Source |
| --- | --- | --- |
| Rimar Salt | Potassium perfluorobutanesulfonate | Lanxess |
| Phosphite Stabilizer | Tris (2,4-di-tert-butylphenyl) phosphite | Irgaphos 168 |

Example 1

(A) Preparation of Cross-linkable Polycarbonates
(i) Solution Addition
Sample A1

Sample A1 was made using solution program addition to obtain a crosslinkable polycarbonate resin containing 1.6 mole % of 4,4'-dihydroxybenzophenone (DHBP).

A solution of p-cumylphenol (193 grams, 0.91 moles, 4.4 mole %) was prepared in 500 mL of dichloromethane. The p-cumylphenol (PCP) solution was placed in an addition pot connected to the reactor via a dosing pump.

To the formulation tank was added dichloromethane (13 L), DI water (10 L), 4,4'-dihydroxybenzophenone (70 grams, 0.33 moles, 1.6 mole %), bisphenol-A (4430 grams, 19.4 moles), triethylamine (52 grams, 0.37 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor. The reactor agitator was started and the circulation flow was set at 80 L/min. Phosgene vapor flow to the reactor was initiated (80 g/min flow rate) by the digital control system (DCS) and an initial amount (240 grams, 2.4 moles) was added. The pH of the reaction was maintained at a target of 10.0 by DCS-controlled addition of 33% aqueous NaOH.

After addition of the initial amount of phosgene, the PCP solution was added to the reactor at 500 mL/min flow rate by DCS control while phosgene flow to the reactor continued. Phosgene addition continued until the total set point was reached (2400 grams, 24.3 moles). After completion of the phosgene addition, a sample of the reactor was obtained and verified to be free of un-reacted BPA and free of chloroformate. Mw of a reaction sample was determined by GPC using a UV detector (Mw=21604, PDI=2.4). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid—liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3855 grams. Mw=21536 PDI=2.3.

Sample A2

Sample A2 was made using solution program addition to obtain a crosslinkable polycarbonate resin containing 5.1 mole % of 4,4'-dihydroxybenzophenone (DHBP).

A solution of p-cumylphenol (196 grams, 0.92 moles, 4.5 mole %) was prepared in 500 mL of dichloromethane. The p-cumylphenol (PCP) solution was placed in an addition pot connected to the reactor via a dosing pump.

To the formulation tank was added dichloromethane (13 L), DI water (10 L), 4,4'-dihydroxybenzophenone (225 grams, 1.1 moles, 5.1 mole %), bisphenol-A (4275 grams, 18.7 moles), triethylamine (52 grams, 0.37 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor. The reactor agitator was started and the circulation flow was set at 80 L/min. Phosgene vapor flow to the reactor was initiated (80 g/min flow rate) by the DCS and an initial amount (240 grams, 2.4 moles) was added. The pH of the reaction was maintained at a target of 10.0 by DCS-controlled addition of 33% aqueous NaOH.

After addition of the initial amount of phosgene, the PCP solution was added to the reactor at 500 mL/min flow rate by DCS control while phosgene flow to the reactor continued. Phosgene addition continued until the total set point was reached (2400 grams, 24.3 moles). After completion of the phosgene addition, a sample of the reactor was obtained and verified to be free of un-reacted BPA and free of chloroformate. Mw of a reaction sample was determined by GPC using a UV detector (Mw=21761, PDI=2.3). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid-liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3995 grams. Mw=21454 PDI=2.2.

Sample A3

Sample A3 was made using solution program addition to obtain a crosslinkable polycarbonate resin containing 10.1 mole % of 4,4'-dihydroxybenzophenone (DHBP).

A solution of p-cumylphenol (198 grams, 0.93 moles, 4.5 mole %) was prepared in 500 mL of dichloromethane. The p-cumylphenol (PCP) solution was placed in an addition pot connected to the reactor via a dosing pump.

To the formulation tank was added dichloromethane (13 L), DI water (10 L), 4,4'-dihydroxybenzophenone (450 grams, 2.1 moles, 10.1 mole %), bisphenol-A (4050 grams, 17.7 moles), triethylamine (52 grams, 0.37 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor. The reactor agitator was started and the circulation flow was set at 80 L/min. Phosgene vapor flow to the reactor was initiated (80 g/min flow rate) by the DCS and an initial amount (240 grams, 2.4 moles) was added. The pH of the reaction was maintained at a target of 10.0 by DCS-controlled addition of 33% aqueous NaOH.

After addition of the initial amount of phosgene, the PCP solution was added to the reactor at 500 mL/min flow rate by DCS control while phosgene flow to the reactor continued. Phosgene addition continued until the total set point was reached (2400 grams, 24.3 moles). After completion of the phosgene addition, a sample of the reactor was obtained and verified to be free of un-reacted BPA and free of chloroformate. Mw of a reaction sample was determined by GPC using a UV detector (Mw=21732, PDI=2.3). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid-liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 4040 grams. Mw=21523 PDI=2.2.

Sample A4

Sample A4 was made using solution program addition to obtain a crosslinkable polycarbonate resin containing 20.1 mole % of 4,4'-dihydroxybenzophenone (DHBP).

A solution of p-cumylphenol (202 grams, 0.95 moles, 4.5 mole %) was prepared in 500 mL of dichloromethane. The p-cumylphenol (PCP) solution was placed in an addition pot connected to the reactor via a dosing pump.

To the formulation tank was added dichloromethane (13 L), DI water (10 L), 4,4'-dihydroxybenzophenone (900 grams, 4.2 moles, 20.1 mole %), bisphenol-A (3600 grams, 15.8 moles), triethylamine (52 grams, 0.37 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor. The reactor agitator was started and the circulation flow was set at 80 L/min. Phosgene vapor flow to the reactor was initiated (80 g/min flow rate) by the DCS and an initial amount (240 grams, 2.4 moles) was added. The pH of the reaction was maintained at a target of 10.0 by DCS-controlled addition of 33% aqueous NaOH.

After addition of the initial amount of phosgene, the PCP solution was added to the reactor at 500 mL/min flow rate by DCS control while phosgene flow to the reactor continued. Phosgene addition continued until the total set point was reached (2400 grams, 24.3 moles). After completion of the phosgene addition, a sample of the reactor was obtained and verified to be free of un-reacted BPA and free of chloroformate. Mw of a reaction sample was determined by GPC using a UV detector (Mw=21732, PDI=2.2). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid-liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3314 grams. Mw=21401 PDI=2.1.

Additional polycarbonates were made using similar processes, but with varying amounts of DHBP and at various molecular weights. Some of these additional polycarbonates are described in Table 1. Various properties were measured using GPC and either a UV detector or an RI detector. The results are also shown in Table 1. The "lows" columns indicate the weight percentage of chains with a molecular weight below 1000.

TABLE 1

| Sample ID | Process | mol % endcap | Mol % DHBP | Mw UV | PDI UV | Lows % UV | Mw RI | PDI RI | Lows % RI | PDI ratio UV/RI |
|---|---|---|---|---|---|---|---|---|---|---|
| A1 | Soln addn | 4.4 | 1.6 | 21536 | 2.3 | 1.32 | 21769 | 2.3 | 1.2 | 1.00 |
| A2 | Soln addn | 4.5 | 5.1 | 21454 | 2.1 | 1.00 | 21836 | 2.3 | 1.3 | 0.91 |
| A3 | Soln addn | 4.5 | 10.1 | 21523 | 2.2 | 1.01 | 21476 | 2.2 | 1.1 | 1.00 |
| A4 | Soln addn | 4.5 | 20.1 | 21401 | 2.1 | 0.9 | 21587 | 2.2 | 1 | 0.95 |

As seen here, all of the solution addition examples had a PDI ratio (UV/RI) of 1.4 or lower. It is noted that the ratios of Sample A2 and Sample A4, which are below 1.0, are likely due to measurement error.

Blend Examples

Example 2

Samples of various dimensions were made from a cross-linkable polycarbonate (XPC) copolymer containing bisphenol-A and 1.6 mole % 4,4'-dihydroxybenzophenone (DHBP), and p-cumylphenol (PCP) endcaps, and having an Mw of 21,536. The XPC copolymer was compared to a low-flow bisphenol-A polycarbonate homopolymer having an Mw≈31,000 (LF-PC). The flame performance of these plaques was tested before and after UV exposure to 30 J/cm$^2$ UVA using unfiltered UV light from the Fusion UV system. Chemical resistance was measured by the elongation at break of tensile bars having 3.2 mm thickness. For flame performance, results for 48 hours are reported on the left column, while results for 168 hours are reported on the right column for each example. The results are shown in Table 2.

TABLE 2

| Components | D1 | | D3 | | D8 | |
|---|---|---|---|---|---|---|
| DHBP LF XPC (1.6 mol %) (phr) | | | 100 | | | |
| LF-PC (phr) | 100 | | | | 100 | |
| Rimar Salt (phr) | 0.1 | | 0.1 | | | |
| Phosphite stabilizer (phr) | 0.06 | | 0.06 | | 0.06 | |
| XPC (DHBP wt %) | — | | 1.6 | | — | |
| Mw by UV detector | | | | | | |
| No UV exposure | 26293 | | 30100 | | | |
| Following UV exposure | 29155 | | 38500 | | | |
| Increase | 2862 | | 8400 | | | |
| MFR (1.2 kg/300° C., 360 sec) | 6.67 | | 6.15 | | 6.51 | |
| MFR (1.2 kg/300° C., 1080 sec) | 7.17 | | 6.39 | | 7 | |
| Gel Thickness (micron) | 0 | | 9.75 | | 0 | |
| Delta Yl | 3.4 | | 20.1 | | 3.8 | |
| Flame Performance (non-UV exposure) | | | | | | |
| p(FTP) for V0 @ 1.5 mm (48 hr/168 hr) | 0 | 0 | 0.823 | 0 | 0 | 0 |
| flaming drips | 2/3 | 3/3 | 0/3 | 3/3 | 3/3 | 3/3 |
| p(FTP) for V0 @ 1.2 mm (48 hr/168 hr) | 0 | 0 | 0 | 0 | 0 | 0 |
| flaming drips | 2/3 | 3/3 | 3/3 | 3/3 | 3/3 | 3/3 |
| p(FTP) for V0 @ 1.0 mm (48 hr/168 hr) | 0 | 0 | 0 | 0 | 0 | 0 |
| flaming drips | 3/3 | 3/3 | 3/3 | 3/3 | 2/3 | 3/3 |
| 5VA @ 1.5 mm (48 hr/168 hr) | Fail | Fail | Fail | Fail | Fail | Fail |
| Flame Performance (UV exposure) | | | | | | |
| p(FTP) for V0 @ 1.5 mm (48 hr/168 hr) | 0 | 0 | 0.99 | 0.769 | 0 | 0 |
| flaming drips | 6/10 | 7/10 | 0/18 | 0/18 | 5/5 | 5/5 |
| p(FTP) for V0 @ 1.2 mm (48 hr/168 hr) | 0 | 0 | 0.982 | 0.977 | 0 | 0 |
| flaming drips | 8/10 | 5/5 | 0/18 | 0/18 | 5/5 | 5/5 |
| p(FTP) for V0 @ 1.0 mm (48 hr/168 hr) | 0.74 | 0 | 0.987 | 0.43 | 0 | 0 |
| flaming drips | 1/18 | 5/5 | 0/18 | 0/18 | 6/10 | 5/5 |
| 5VA @ 1.5 mm | Fail | Fail | Pass | Fail | Fail | Fail |
| Chemical Resistance (Elongation @ Break) | | | | | | |
| As molded bar | 134.2 | | 119.9 | | 124.9 | |
| Acetone @ 0.5% strain | | | | | | |
| No UV | 10.5 | | 1.5 | | 0.0 | |
| Exposed to UV | 5.9 | | 97.0 | | 9.2 | |
| Acetone @ 1% strain | | | | | | |
| No UV | 0.0 | | 0.0 | | 0.0 | |
| Exposed to UV | 0.0 | | 78.2 | | 0.0 | |

Example 3

Next, an XPC resin was made that contained 5 mole % DHBP, remainder bisphenol-A, and used PCP endcaps. This XPC resin had an Mw of about 21,000. This XPC resin was blended with a low-flow bisphenol-A polycarbonate homopolymer having an Mw≈31,000 (LF-PC).

Molded mouse covers were then made from the blend, and from the LF-PC as control. The compositions were injection molded to obtain the molded mouse cover. The molded mouse cover was then exposed to 36 J/cm$^2$ UVA of filtered UV light in the Loctite system, with the top facing the UV lamp. The gel thickness of the mouse cover was measured in three locations. The presence of a gel layer indicated that crosslinking had occurred. The YI of the mouse cover was also measured before UV exposure, and 48 hours after UV exposure. The results are seen in Table 3.

TABLE 3

| Components | E1 | E2 |
|---|---|---|
| 5 mole % DHBP @ 21K (phr) | 50 | 0 |
| LF-PC (phr) | 50 | 100 |
| Phosphite stabilizer (phr) | 0.06 | 0.06 |
| MFR (1.2 kg/300° C., 360 sec) | 9.55 | 6.5 |
| MFR (1.2 kg/300° C., 1080 sec) | 9.92 | 6.49 |
| Gel Thickness of covers (micron) | | |
| Front | 11.62 | — |
| Middle | 22.44 | — |
| Back | 14.61 | — |
| Average whole part | 16.23 | — |
| Gel Thickness of t-bar control (micron) | 20.90 | — |
| YI (unexposed) | 0.16 | −0.16 |
| YI (exposed to UV) | 4.23 | 0.57 |
| Delta YI | 4.07 | 0.73 |

Example 4

Next, five different XPC resins were tested. The resins were copolymers of bisphenol-A and 4,4'-dihydroxybenzophenone (DHBP), and used PCP endcaps. The first resin contained 5 mole % DHBP and had a target Mw of about 21,000. The second resin contained 5 mole % DHBP and had a target Mw of about 26,000. The third resin contained 10 mole % DHBP and had a target Mw of about 21,000. The fourth resin contained 10 mole % DHBP and had a target Mw of about 26,000. The fifth resin contained 20 mole % DHBP and had a target Mw of about 21,000.

The five XPC resins were blended with a low-flow bisphenol-A polycarbonate homopolymer having an Mw≈31,000 (LF-PC) in various amounts, and properties were tested. The results are shown in Tables 4A and 4B. For flame performance, results for 48 hours are reported on the left column, while results for 168 hours are reported on the right column for each example. UV exposure was to 36 J/cm$^2$ UVA of filtered UV light in the Loctite system, with the top facing the UV lamp. Chemical resistance was measured by the elongation at break of tensile bars having 3.2 mm thickness.

The blends generally had a greater increase in molecular weight after UV exposure, and also had a lower MFR. The blends also had better chemical resistance than the neat resins.

TABLE 4A

| | F01 | F02 | F03 | F04 | F05 |
|---|---|---|---|---|---|
| 5 mole % DHBP @ 21K (phr) | 100.00 | 50.00 | | | |
| 5 mole % DHBP @ 26K (phr) | | | 100.00 | 50.00 | |
| 10 mole % DHBP @ 21K (phr) | | | | | 100.00 |
| LF-PC (phr) | | 50.00 | | 50.00 | |
| Rimar Salt (phr) | 0.08 | 0.08 | 0.08 | 0.08 | 0.08 |
| Phosphite stabilizer (phr) | 0.06 | 0.06 | 0.06 | 0.06 | 0.06 |
| Mw by UV detector | | | | | |
| No UV exposure | 21,186 | 23,803 | 24,873 | 26,037 | 20,784 |
| Following UV exposure | 25,090 | 29,303 | 29,892 | 32,958 | 24,117 |
| Increase | 3,904 | 5,500 | 5,019 | 6,921 | 3,333 |
| MFR (1.2 kg/300° C., 360 sec) | 24.2 | 11.9 | 11.4 | 8.55 | 24.2 |
| MFR (1.2 kg/300° C., 1080 sec) | 25.2 | 12.8 | 11.9 | 8.7 | 24.6 |
| Gel Thickness (micron) | 22.18 | 8.48 | 26.50 | 11.11 | 35.42 |
| YI unexposed part | 2.68 | 2.97 | 2.83 | 2.10 | 3.48 |
| YI after UV exposure | 9.47 | 10.35 | 10.24 | 9.82 | 14.44 |
| Delta YI | 6.8 | 7.4 | 7.4 | 7.7 | 11.0 |
| Flame Performance (no UV exposure) | | | | | |
| Flaming drips out of 3 @ 1.0 mm (48 hr) | 3 | 2 | 3 | 3 | 3 |
| Flaming drips out of 2 @ 1.2 mm (48 hr) | 2 | 2 | 0 | 2 | 2 |
| 5VB @ 1.2 mm (48 hr/168 hr) | Fail   Fail | Fail   Fail | Fail   Fail | Fail   Fail | Fail   Fail |
| 5VB @ 1.5 mm (48 hr/168 hr) | Fail   Fail | Fail   Fail | 1/2   Fail | 1/2   1/2 | Fail   Fail |
| 5VA @ 1.5 mm (48 hr/168 hr) | Fail   Fail | Fail   Fail | Fail   Fail | Fail   Fail | Fail   Fail |
| Flame Performance (after UV exposure) | | | | | |
| p(FTP) for V0 @ 1.0 mm (48 hr) | 0 | 0.0468 | 0.0391 | 0.015 | 0.6457 |
| flaming drips (out of 20) | 2/5 | 1 | 0 | 0 | 1 |
| p(FTP) for V0 @ 1.2 mm (48 hr) | 0.009 | 0.075 | 0.7247 | 0.4847 | 0.8171 |
| flaming drips (out of 20) | 8 | 3 | 0 | 0 | 0 |
| p(FTP) for V0 @ 1.5 mm (48 hr) | 0.0006 | 0.2399 | — | 0.068 | — |
| flaming drips (out of 20) | 5/10 | 0 | — | 3 | — |
| 5VB @ 1.2 mm (48 hr/168 hr) | Fail   Fail | Fail   Fail | Fail   Pass | 5/10 drip   4/10 drip | Fail   Fail |

TABLE 4A-continued

|  | F01 | F02 | F03 | F04 | F05 |
|---|---|---|---|---|---|
| 5VB @ 1.5 mm (48 hr/168 hr) | Fail Fail | Fail Fail | 1/10 drip 5/10 drip Pass | 7/10 drip 1/10 drip | 7/10 drip Pass |
| 5VA @ 1.5 mm (48 hr/168 hr) | Pass Pass | Pass Pass | Fail (2/3) Pass Pass | Pass Fail | Pass Pass |
| Chemical Resistance (elongation at break) | | | | | |
| As molded bar | 131.2 | 138.2 | 136.9 | 127.8 | 120.6 |
| Acetone @ 0.5% strain | | | | | |
| No UV | 4.2 | 5.6 | 2.6 | 9.7 | 1.0 |
| Exposed to UV | 101.1 | 112.8 | 93.4 | 110.5 | 89.1 |
| Acetone @ 1% strain | | | | | |
| No UV | Fail | Fail | Fail | 3.0 | Fail |
| Exposed to UV | 26.3 | 95.1 | 92.8 | 102.8 | 42.4 |

TABLE 4B

|  | F06 | F07 | F08 | F09 | F10 |
|---|---|---|---|---|---|
| 10 mole % DHBP @ 21K (phr) | 25.00 | | | | |
| 10 mole % DHBP @ 26K (phr) | | 100.00 | 25.00 | | |
| 20 mole % DHBP @ 21K (phr) | | | | 100.00 | 12.50 |
| LF-PC (phr) | 75.00 | | 75.00 | | 87.50 |
| Rimar Salt (phr) | 0.08 | 0.08 | 0.08 | 0.08 | 0.08 |
| Phosphite stabilizer (phr) | 0.06 | 0.06 | 0.06 | 0.06 | 0.06 |
| Mw by UV detector | | | | | |
| No UV exposure | 24,490 | 25,030 | 26,742 | 20,859 | 26,174 |
| Following UV exposure | 32,543 | 29,328 | 35,180 | 24,131 | 34,484 |
| Increase | 8,053 | 4,298 | 8,438 | 3,272 | 8,310 |
| MFR (1.2 kg/300° C., 360 sec) | 8.65 | 11.5 | 7.93 | 25.2 | 8.14 |
| MFR (1.2 kg/300° C., 1080 sec) | 9.42 | 12 | 8.36 | 24.6 | 8.09 |
| Gel Thickness (micron) | 13.50 | 36.74 | 15.46 | 27.06 | 7.95 |
| Yl unexposed part | 2.28 | 3.80 | 2.43 | 4.98 | 2.77 |
| Yl after UV exposure | 11.65 | 12.09 | 11.83 | 20.68 | 11.98 |
| Delta Yl | 9.4 | 8.3 | 9.4 | 15.7 | 9.2 |
| Flame Performance (no UV exposure) | | | | | |
| Flaming drips out of 3 @ 1.0 mm (48 hr) | 3 | 3 | 1 | 3 | 2 |
| Flaming drips out of 2 @ 1.2 mm (48 hr) | 0 | 1 | 1 | 2 | 0 |
| 5VB @ 1.2 mm (48 hr/168 hr) | Fail Fail | Fail Fail | Fail Fail | Fail Fail | Fail Fail |
| 5VB @ 1.5 mm (48 hr/168 hr) | 1/2 Fail | 0/2 Fail | 1/2 0/2 | Fail Fail | Fail Fail |
| 5VA @ 1.5 mm (48 hr/168 hr) | Fail Fail | Fail Fail | Fail Fail | Fail Fail | Fail Fail |
| Flame Performance (after UV exposure) | | | | | |
| p(FTP) for V0 @ 1.0 mm (48 hr) | 0.3345 | 0.0651 | 0.0965 | 0.415 | 0.0402 |
| flaming drips (out of 20) | 0 | 2 | 1 | 1 | 1 |
| p(FTP) for V0 @ 1.2 mm (48 hr) | 0.5372 | 0.3463 | 0.3242 | 0.0716 | 0.6925 |
| flaming drips (out of 20) | 0 | 1 | 1 | 6 | 0 |
| p(FTP) for V0 @ 1.5 mm (48 hr) | 0.0001 | 0.6074 | 0.5346 | 0.3206 | 0.571 |
| flaming drips (out of 20) | 4/10 | 0 | 0 | 3 | 1/19 |
| 5VB @ 1.2 mm (48 hr/168 hr) | Fail Fail | Fail Fail | Fail Fail | Fail Fail | Fail Fail |
| 5VB @ 1.5 mm (48 hr/168 hr) | Fail Pass | Fail Pass | 6/10 drip Pass | Fail Pass | Fail 1/10 drip |
| 5VA @ 1.5 mm (48 hr/168 hr) | Pass Pass | Pass Pass | Pass Fail (1/3) | Pass Pass | Pass Pass |
| Chemical Resistance (elongation at break) | | | | | |
| As molded bar | 128.4 | 129.1 | 126.4 | 96.6 | 126.2 |
| Acetone @ 0.5% strain | | | | | |
| No UV | 11.1 | 4.7 | 16.0 | Fail | 6.9 |
| Exposed to UV | 102.9 | 87.8 | 101.4 | 78.5 | 103.0 |
| Acetone @ 1% strain | | | | | |
| No UV | 6.0 | Fail | Fail | Fail | Fail |
| Exposed to UV | 59.8 | 89.0 | 96.9 | 50.3 | 96.3 |

Example 5

Next, an XPC-1 polycarbonate formed from bisphenol-A and having 20 mole % 4,4'-dihydroxybenzophenone, remainder bisphenol-A, and p-cumylphenol endcaps and a molecular weight of about 21,000 g/mol by polycarbonate standards was blended with other polymers and cast or pressed into films of 40-60 micrometers.

Those polymers were a sebacic acid-co-bisphenol A copolymer (SA-BPA); a copolyester polymer (TRITAN TX1000 from Eastman); a polystyrene polymer (Crystal Polystyrene 585 from Total Petrochemicals); a poly(methyl methacrylate) polymer (PERSPEX CP-61); a dimethyl bisphenol cyclohexane-co-bisphenol-A copolymer (DMBPC-BPA, DMX1435); a thermoplastic polyester (PCTG) containing 80% CHDM; a polybutylene terephthalate polymer (VALOX 195); a methyl methacrylate-butadiene-styrene copolymer with 70% rubber content (MBS); and an acrylonitrile-butadiene-styrene copolymer with 16% rubber content (ABS).

A total of 12 compositions, labeled PCB-1 through PCB-12, were made. PCB-1 was a control, and was 100% XPC-1 (i.e. no blend). As a second control, an XPC-2 polycarbonate formed from bisphenol-A and having 5 mole % 4,4'-dihydroxybenzophenone, remainder bisphenol-A, and p-cumylphenol endcaps and a molecular weight of 26,000 g/mol by polycarbonate standards was also used. Films were then made from the 12 compositions. PCB-1 through PCB-8 were supported on glass slides (25×75 mm films). PCB-9 through PCB-12 were pressed films (50 mm diameter discs).

The films formed from the 12 compositions were then exposed to filtered UV radiation using the Loctite UV system. Only one surface of each film was exposed. The films were irradiated simultaneously for 0.5, 0.75, 1, 2, or 12 J/cm$^2$ of UVA energy by exposing the film for 13 seconds, 19.5 seconds, 26 seconds, 54 seconds, or 320 seconds, respectively. The glass transition temperature (Tg) was measured using DSC.

After exposure, the films were immersed in 10 mL of methylene chloride and monitored for any residual material at 48 hours. The presence of gel was taken as an indicator of crosslinking. It was noted that any blends containing PCTG or PBT required additional solvents to completely dissolve. These could be dissolved in mixtures of phenol and trichloroethane, or through repeated exposure to mixtures of methylene chloride and cresol.

The results are provided in Tables 5A and 5B. The amounts of the polymers are reported in weight percent. Crosslinking was indicated with Y if the number of gels was equal to the number of films, i.e. all films formed a continuous gel layer. They were marked with a G if the number of gels was greater than the number of films, i.e. the gel layer was fragmented into several pieces. If there were no visible gels, the compositions were marked with an N. Two DSC values were recorded in systems with immiscible blends where the two Tg values were still distinct.

All of the blends containing XPC-1 (20 mole % DHBP) formed insoluble gel in less than 30 seconds, except PCB-12 containing ABS. Six of the blends formed insoluble gel at 0.5 J/cm$^2$.

TABLE 5A

| Components | PCB-1 | PCB-2 | PCB-3 | PCB-4 | PCB-5 | PCB-6 |
|---|---|---|---|---|---|---|
| XPC-1 (20 mol %) | 100 | | 50 | 80 | 80 | 80 |
| XPC-2 (5 mol %) | | 100 | | | | |
| SA-BPA | | | | 20 | | |
| Tritan | | | | | 20 | |
| Polystyrene | | | 50 | | | 20 |
| Crosslinked @ 0 UVA J/cm$^2$ | N | N | N | N | N | |
| Crosslinked @ 0.5 UVA J/cm$^2$ | G | N | N | G | G | G |
| Crosslinked @ 0.75 UVA J/cm$^2$ | G | N | G | G | G | G |
| Crosslinked @ 1 UVA J/cm$^2$ | Y | N | G | Y | G | G |
| Crosslinked @ 2 UVA J/cm$^2$ | Y | G | G | Y | Y | Y |
| Crosslinked @ 12 UVA J/cm$^2$ | Y | Y | Y | Y | Y | Y |
| DSC Tg (° C.) @ 0 UVA J/cm$^2$ | 146 | 146 | 105, 146 | 144 | 105, 146 | 109, 145 |
| DSC Tg (° C.) @ 12 UVA J/cm$^2$ | 150 | 147 | 107, 147 | 146 | 103, 148 | 106, 147 |
| mole % DHBP of composition | 20 | 5 | 10 | 16 | 16 | 16 |

TABLE 5B

| Components | PCB-7 | PCB-8 | PCB-9 | PCB-10 | PCB-11 | PCB-12 |
|---|---|---|---|---|---|---|
| XPC-1 (20 mol %) | 80 | 80 | 75 | 75 | 85 | 85 |
| PMMA | 20 | | | | | |
| DMBPC-BPA | | 20 | | | | |
| PCTG | | | 25 | | | |
| PBT Valox 195 | | | | 25 | | |
| MBS | | | | | 15 | |
| ABS | | | | | | 15 |
| Crosslinked @ 0 UVA J/cm$^2$ | N | N | N | N | N | N |
| Crosslinked @ 0.5 UVA J/cm$^2$ | N | G | G | N | G | N |
| Crosslinked @ 0.75 UVA J/cm$^2$ | G | G | G | G | G | N |
| Crosslinked @ 1 UVA J/cm$^2$ | G | G | Y | G | G | N |
| Crosslinked @ 2 UVA J/cm$^2$ | Y | Y | Y | G | G | G |
| Crosslinked @ 12 UVA J/cm$^2$ | Y | Y | Y | Y | Y | Y |
| DSC Tg (° C.) @ 0 UVA J/cm$^2$ | 146 | 146 | 122 | 118 | 147 | 109, 144 |
| DSC Tg (° C.) @ 12 UVA J/cm$^2$ | 148 | 147 | 120 | 115 | 146 | 107, 143 |
| mole % DHBP of composition | 16 | 16 | 15 | 15 | 17 | 17 |

Example 6

Next, some additional compositions W01-W07 were made as blends. The blends included the XPC-1 resin (20 mole % DHBP), and another polymer. Films were exposed to 1.5, 2, 3, or 12 J/cm$^2$ of UVA energy by exposing the film to filtered UV light using the Loctite system for 40 seconds, 54 seconds, 80 seconds, or 320 seconds, respectively. The amounts of the polymers are reported in weight percent. The results are reported in the same manner as Tables 5A and 5B, and are listed below in Table 6.

TABLE 6

| Components | W01 | W02 | W03 | W04 | W05 | W06 | W07 |
|---|---|---|---|---|---|---|---|
| XPC-1 (20 mole %) | 20 | 25 | 25 | 20 | 20 | 20 | 20 |
| Tritan | 80 | | | | | | |
| PCTG | | 75 | | | | | |
| PBT | | | 75 | | | | |
| Polystyrene | | | | 80 | | | |
| PMMA | | | | | 80 | | |
| SA-BPA | | | | | | 80 | |
| DMBPC-BPA | | | | | | | 80 |
| Crosslinked @ 0 UVA J/cm$^2$ | N | N | N | N | N | N | N |
| Crosslinked @ 1.5 UVA J/cm$^2$ | G | G | G | G | G | G | G |
| Crosslinked @ 2 UVA J/cm$^2$ | G | G | G | G | G | Y | G |
| Crosslinked @ 3 UVA J/cm$^2$ | G | Y | G | G | G | Y | Y |
| Crosslinked @ 12 J/cm$^2$ | Y | Y | G | G | G | Y | Y |
| DSC Tg (° C.) @ 0 UVA J/cm$^2$ | 118 | 95 | | 104 | 105, 144 | 136 | 133 |
| DSC Tg (° C.) @ 12 UVA J/cm$^2$ | 117 | 99 | | 105 | 103 | 135 | 140 |
| Phase separated | N | N | Y | Y | Y | N | N |

In W04 and W05, the polystyrene and the PMMA were the dominant phase, with small but visible polycarbonate spheres present floating in solution after immersion. A transition to a continuous gel layer did not occur, which was a predictable result with this morphology. The other blend samples formed a continuous gel layer, allowing for a continuous gel layer to eventually form. This effect was also seen in W03, where the PBT prevented a continuous gel from forming at the exposed surface. DSC analysis for W03 indicated no peak for a distinct glass transition temperature. A melting temperature peak at 221° C. was present for W03.

Example 7

From the blends previously listed, some compositions were exposed at additional doses using XPC-1 and XPC-2, blended with LF-PC, and additional blends were made (labeled B1-B3). Films were exposed to 1, 1.5, 2, 3, or 12 J/cm$^2$ of UVA energy by exposing the film for 26 seconds, 40 seconds, 54 seconds, 80 seconds, or 320 seconds, respectively, to filtered UV light in the Loctite system. The amounts of the polymers are reported in weight percent. The results are reported in the same manner as Tables 5A and 5B, and are listed below in Table 7. The rows for Mw were for weight-average molecular weight measured by GPC using a UV detector and polycarbonate standards.

TABLE 7

| Components | B1 | B2 | W06 | W07 | B3 | W02 |
|---|---|---|---|---|---|---|
| XPC-1 (20 mole %) | 20 | | 20 | 20 | 25 | 25 |
| LF-PC | 80 | | | | | |
| XPC-2 (5 mole %) | | 100 | | | | |
| SA-BPA | | | 80 | | | |
| DMBPC-BPA | | | | 80 | | |
| PCTG | | | | | 75 | 75 |
| mole % DHBP of composition | 4 | 5 | 4 | 4 | 5 | 5 |
| Crosslinked @ 1 UVA J/cm$^2$ | N | N | G | G | G | N |
| Crosslinked @ 1.5 UVA J/cm$^2$ | G | N | Y | G | G | G |
| Crosslinked @ 2 UVA J/cm$^2$ | G | G | Y | G | G | G |
| Crosslinked @ 3 UVA J/cm$^2$ | G | G | Y | Y | G | G |
| Crosslinked @ 12 J/cm$^2$ | Y | Y | Y | Y | Y | Y |
| Mw @ 0 UVA J/cm$^2$ | 24610 | 22401 | 26346 | 22316 | — | — |
| Mw @ 1 UVA J/cm$^2$ | 28627 | 25692 | 36839 | 30841 | — | — |
| Mw @ 1.5 UVA J/cm$^2$ | 29438 | 26115 | 40924 | 31483 | — | — |
| Mw @ 2 UVA J/cm$^2$ | 34999 | 29374 | 49510 | 38279 | — | — |
| Mw @ 3 UVA J/cm$^2$ | 35092 | 32085 | 63962 | 39890 | — | — |
| Mw @ 12 UVA J/cm$^2$ | 46704 | 42098 | 56484 | 38466 | — | — |

It was noted that the XPC-2 created no visible gel at 1.5 J/cm$^2$ where the XPC-1 blends all exhibited some gel formation. This effect occurred even though the DHBP mole % in XPC-1 compositions was equal or less than DHBP mole % in XPC-2 compositions. 4 mole % DHBP levels were sufficient for crosslinking, as seen in B1, W06, and W07. At 1.5 J/cm$^2$ of UVA, the blend containing SA-BPA (W06) formed a continuous gel layer, while there was no crosslinked gel present in the XPC-2 film (B2). Generally, the molecular weight increased with UV exposure, indicating that crosslinking occurred.

FTIR was performed on the crosslinked gel fractions of PCB-1, W06, and W07 after the 12 J/cm$^2$ UVA exposure and recovered after immersion in methylene chloride. FTIR was also performed on the powder form of the SA-BPA and the DMBPC-BPA. The spectra for PCB-1 gel fraction material was used as the control. The theory was that if W06/W07 had formed a crosslinked network containing both the XPC resin and the other polymer (SA-BPA or DMBPC-BPA), then the FTIR for W06M/07 should have a signal indicating peaks of both ingredients.

Figure 4:
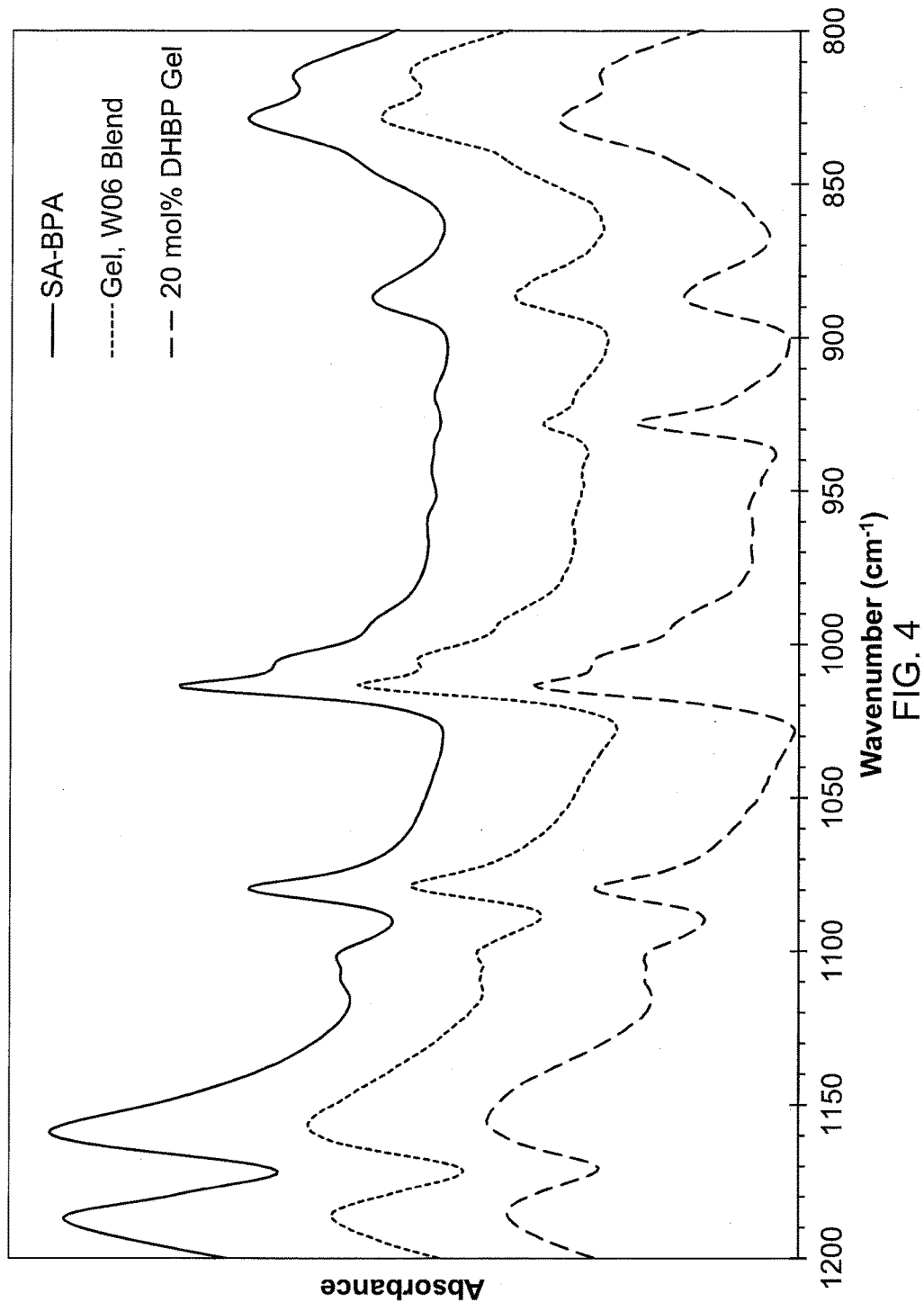
FIG. 4 is a graph showing the FTIR spectra for the additive, a polymer, and a gel. The ratio of the certain peaks indicates that a crosslinked network has been formed.

FIG. 4 is a graph showing the FTIR spectra for PCB-1, the SA-BPA, and the W06 gel. The ratio of the peaks at 887 cm$^{-1}$ and 929 cm$^{-1}$ are significantly different in the blend gel, indicating that both polymers are incorporated in the crosslinked gel layer.

Figure 5:
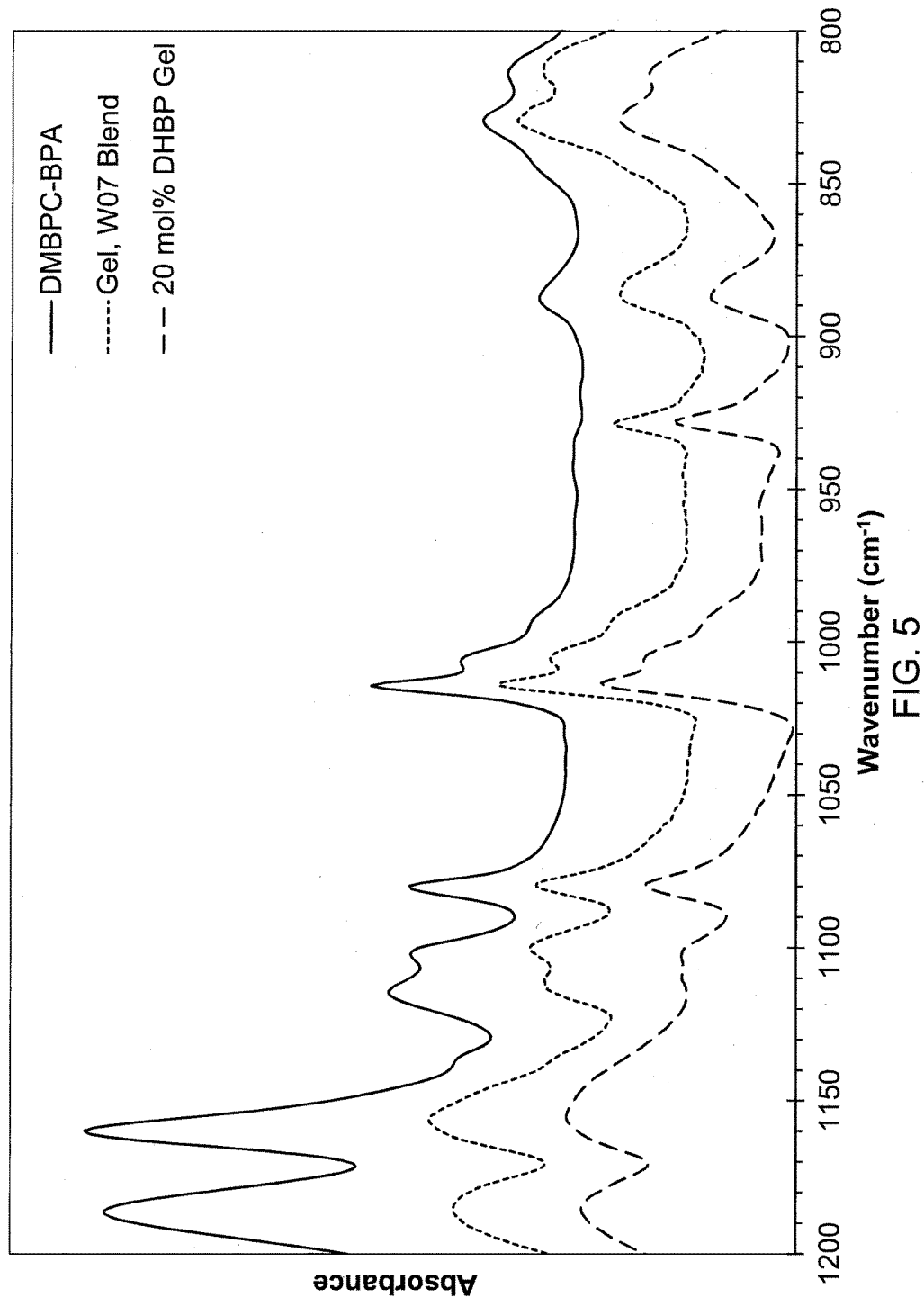
FIG. 5 is a graph showing the FTIR spectra for the additive, a different polymer, and a gel, with wavenumbers from 1200 cm$^{-1}$ to 800 cm$^{-1}$. The ratio of the certain peaks indicates that a crosslinked network has been formed.

FIG. 5 is a graph showing the FTIR spectra for PCB-1, the DMBPC-B{A, and the W07 gel, with wavenumbers from 1200 cm$^{-1}$ to 800 cm$^{-1}$. The ratio of the peaks at 1100 cm$^{-1}$ and 1114 cm$^{-1}$ are present in both the W07 gel and the DMBPC-BPA spectra, indicating that both polymers are incorporated in the crosslinked gel layer.

Figure 6:
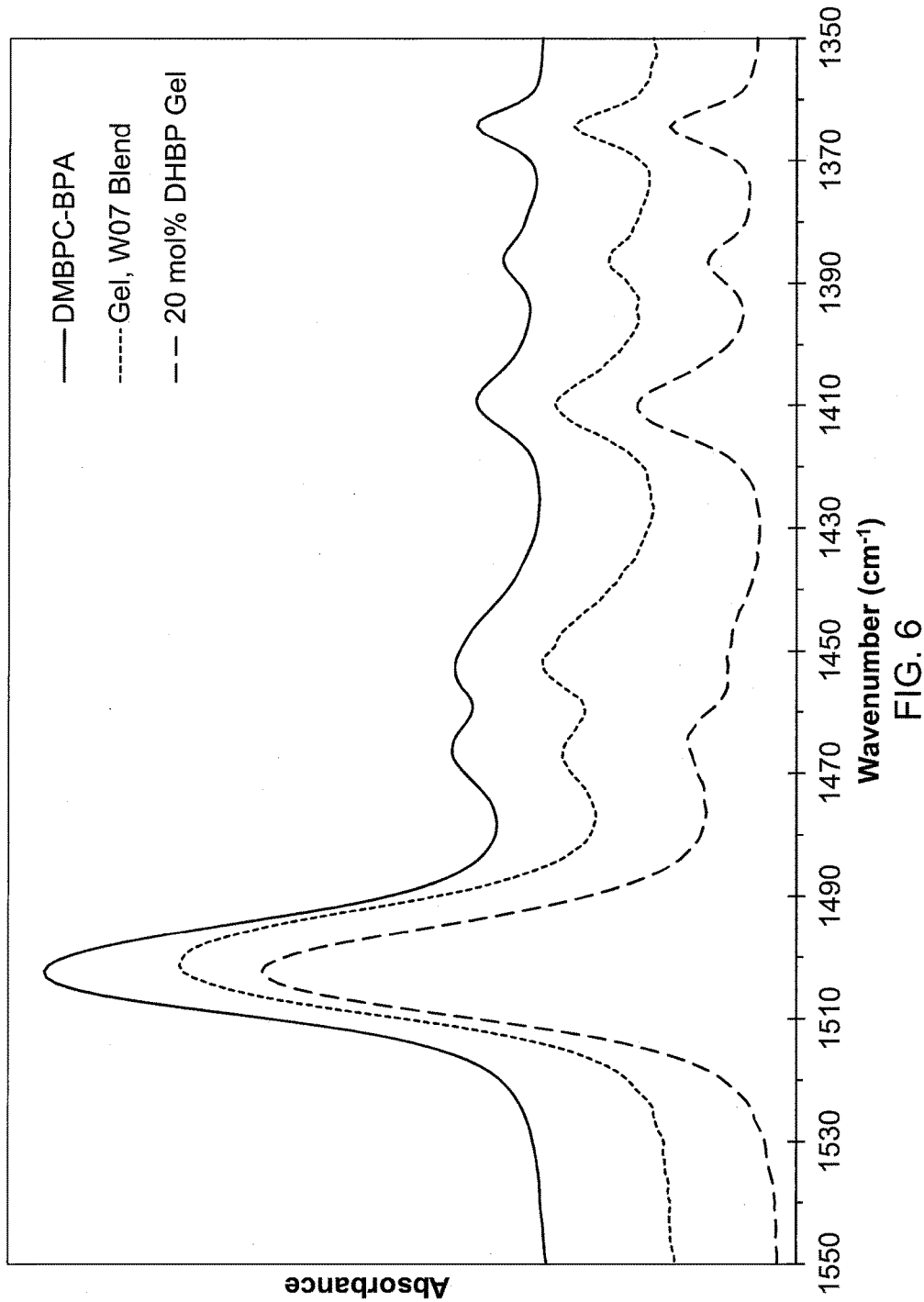
FIG. 6 is a graph showing the FTIR spectra for the additive, polymer, and gel of FIG. 5, with wavenumbers from 1550 cm$^{-1}$ to 1350 cm$^{-1}$. The peak at 1452 cm$^{-1}$ appears in the spectra for the gel and the polymer, indicating a crosslinked network.

FIG. 6 is a graph showing the FTIR spectra for PCB-1, the DMBPC-BPA, and the W07 gel, with wavenumbers from 1550 cm$^{-1}$ to 1350 cm$^{-1}$. The peak at 1452 cm$^{-1}$ appears in both the W07 gel and the DMBPC-BPA spectra, while not present in the control spectra.

Together, the FTIR data indicates that the gel contains the reaction product formed by crosslinking of the XPC resin with the other polymer.

Next, an XPC-3 polycarbonate was formed from bisphenol-A having 3.45 mole % 4-hydroxybenzophenone (4-HBP) endcaps and a molecular weight of 22,000 g/mol. The XPC-1 and XPC-3 resins were blended with the LF-PC resin in various amounts to make compositions B1-B9. Films were exposed to 1.5, 2, 3, or 12 J/cm$^2$ of UVA energy by exposing the film for 40 seconds, 54 seconds, 80 seconds, or 320 seconds, respectively, to filtered UV light in the Loctite system. The amounts of the polymers are reported in weight percent. The results are listed below in Table 8.

TABLE 8

| Components | B2 | B4 | B3 | B1 | B5 | B6 | B7 | B8 | B9 |
|---|---|---|---|---|---|---|---|---|---|
| XPC-1 (20 mole % DHBP) | 100 | 30 | 25 | 20 | 10 | 5 | | | |
| LF-PC | | 70 | 75 | 80 | 90 | 95 | | 42 | 70 |
| XPC-3 (3.45 mole % 4-HBP) | | | | | | | 100 | 58 | 30 |
| mole % benzophenone in composition | 20 | 6 | 5 | 4 | 2 | 1 | 3.45 | 2 | 1.04 |
| Crosslinked @ 0 UVA J/cm$^2$ | N | N | N | N | N | N | N | N | N |
| Crosslinked @ 1.5 UVA J/cm$^2$ | Y | G | G | G | N | N | N | N | N |
| Crosslinked @ 2 UVA J/cm$^2$ | Y | Y | G | G | G | N | G | N | N |
| Crosslinked @ 3 UVA J/cm$^2$ | Y | Y | Y | G | G | G | G | N | N |
| Crosslinked @ 12 J/cm$^2$ | Y | Y | Y | Y | Y | G | Y | G | N |

At 12 J/cm$^2$, blends containing 10 wt % of the 20 mole % XPC-1 resin still showed enough crosslink formation to create a continuous gel layer. A crosslinked gel was formed in B5 having 2 mole % of the dihydroxybenzophenone, while the corresponding sample B8 having the same mole % of monohydroxybenzophenone as endcaps failed to produce a crosslinked gel. The UV dosage needed to obtain a continuous gel layer (Y) varied depending on the total DHBP content and the identity of the other resin.

Example 8

The XPC-1 resin (20 mole % DHBP, Mw-21k) was blended with a polyetherimide (PEI, ULTEM 1010) and a polyethersulfone (PES, ULTRASON E2010) in various amounts. These resins have a high glass transition temperature. The resins were then exposed to 2, 3, or 12 J/cm$^2$ of UVA energy by exposing the film for 54 seconds, 80 seconds, or 320 seconds, respectively, to filtered UV light in the Loctite system. The results are shown below in Table 9. Crosslinking was present in these examples. C1 and C2 unexpectedly formed a continuous gel layer. This was unexpected because (a) the films were nearly opaque, indicating phase separation; and (b) PEI strongly absorbs UVA radiation from 250-395 nm.

TABLE 9

| Components | C1 | C2 | C3 | C4 | C5 | C6 |
|---|---|---|---|---|---|---|
| XPC-1 (20 mole % DHBP) | 85 | 50 | 50 | 20 | | |
| PEI | 15 | 50 | | | 100 | |
| PES | | | 50 | 80 | | 100 |
| Crosslinked @ 0 UVA J/cm$^2$ | N | N | N | N | N | N |
| Crosslinked @ 2 UVA J/cm$^2$ | G | G | G | G | | |
| Crosslinked @ 3 UVA J/cm$^2$ | Y | G | G | G | | |
| Crosslinked @ 12 J/cm$^2$ | Y | Y | Y | Y | N | N |

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:
1. A polymeric blend, comprising:
a photoactive additive that is a cross-linkable polycarbonate resin containing a photoactive group derived from a dihydroxybenzophenone which is a dihydroxyphenyl-phenylmethanone, a bis(hydroxyphenyl)methanone, a 1-dihydroxyphenyl-2-phenylethane-1,2-dione, a 1,2-bis(hydroxyphenyl)ethane-1,2-dione, a 1-(dihydroxyphenyl)-2-hydrocaroxy-2-phenylethanone, a 1,2-bis(hydroxyphenyl)-2-hydrocarboxy-ethanone, a dihydroxydibenzo[1,3-e:1',2'-f][7]annulen-11-one, or a dihydroxythioxanthen-9-one;
a polymer resin which is different from the photoactive additive; and
a flame retardant, wherein the flame retardant is potassium perfluorobutane sulfonate (Rimar salt), potassium diphenyl sulfone-3-sulfonate (KSS), or a combination thereof; and
wherein the photoactive additive does not contain units derived from a bisphenolpolydiorganosiloxane and is formed from a reaction comprising:
the dihydroxybenzophenone;
a diol chain extender other than the bisphenolpolydiorganosiloxane;
a first linker moiety comprising a plurality of linking groups, wherein each linking group reacts with the hydroxyl groups of the dihydroxybenzophenone and the diol chain extender; and
an end-capping agent;
wherein the molar ratio of the dihydroxybenzophenone to the first linker moiety is from 1:2 to 1:200 prior to UV exposure; and
the weight ratio of the photoactive additive to the polymer resin is from about 10:90 to about 15:85.
2. The blend of claim 1, wherein the polymer resin is a polyester, a polyestercarbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.
3. The blend of claim 1, wherein the polymer resin is a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyethersulfone, a polyphenylsulfone, a poly(alkenylaromatic) polymer, a polybutadiene, a polyacetal, a polycar- bonate, a polyphenylene ether, an ethylene-vinyl acetate copolymer, a polyvinyl acetate, a liquid crystal polymer, an ethylenetetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units.

4. The blend of claim 1, wherein the polymer resin is a homopolycarbonate, a copolycarbonate, a polycarbonate-polysiloxane copolymer, a polyester-polycarbonate, or a p-cumyl phenol capped poly(isophthalate-terephthalate-resorcinol ester)-co-(bisphenol-A carbonate) copolymer.

5. The blend of claim 1, wherein the polymer resin is a p-cumyl phenol capped poly(isophthalate-terephthalate-resorcinol ester)-co-(bisphenol-A carbonate) polymer or a polycarbonate-polysiloxane copolymer having a polysiloxane content from 0.4 wt % to 25 wt %.

6. The blend of claim 5, wherein the polycarbonate-polysiloxane copolymer is a siloxane block co-polycarbonate comprising from about 6 wt % siloxane (±10%) to about 20 wt % siloxane (±10%), and having a siloxane chain length of 10 to 200.

7. The blend of claim 1, wherein the polymer resin is a polyphosphonate polymer, a polyphosphonate copolymer, or a poly(polyphosphonate)-co-(BPA carbonate) copolymer.

8. The blend of claim 1, wherein the polymer resin is selected from the group consisting of a polycarbonate-polysiloxane copolymer; a polycarbonate resin having an aliphatic chain containing at least two carbon atoms as a repeating unit in the polymer backbone; an ethylene-acrylic ester-glycidyl acrylate terpolymer; a copolyester polymer; a bisphenol-A homopolycarbonate; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; a dimethyl bisphenol cyclohexane-co-bisphenol-A copolymer; a polyetherimide; a polyethersulfone; and a copolycarbonate of bisphenol-A and 1,1-bis(4-hydroxyphenyl)-3,3,5-trimethylcyclohexane).

9. The blend of claim 1, wherein the end-capping agent is selected from the group consisting of phenol, p-t-butylphenol, p-cumylphenol, octylphenol, and p-cyanophenol.

10. The blend of claim 1, wherein the photoactive additive has a weight average molecular weight of 15,000 or greater prior to UV exposure.

11. The blend of claim 1, wherein the photoactive additive is a cross-linkable polycarbonate resin having a weight-average molecular weight of between 17,000 and 80,000 Daltons, as measured by GPC using a UV-VIS detector and polycarbonate standards prior to UV exposure.

12. The blend of claim 1, wherein the cross-linkable polycarbonate resin has a polydispersity index (PDI) of between 2.0 and 3.0 as measured by GPC using a UV-VIS detector and polycarbonate standards prior to UV exposure.

13. The blend of claim 1, wherein the cross-linkable polycarbonate resin has a melt flow rate of about 1 to about 40 g/10 min at 300° C/1.2 kg/360 sec dwell.

14. The additive of claim 1, wherein the photoactive additive is a cross-linkable polycarbonate resin having a melt flow rate of about 1 to about 40 g/10 min at 300° C/1.2 kg/360 sec dwell, and a plaque formed from the cross-linkable polycarbonate resin can achieve UL94 5VA performance at a thickness of 1.5 mm (±10%) after UV irradiation of 36.0 J/cm$^2$ UVA.

15. The blend of claim 1, wherein the flame retardant is present in an amount of about 0.06 wt % to about 0.08 wt %.

16. The blend of claim 1, further comprising a heat stabilizer and a mold release agent.

17. The blend of claim 1, further comprising an UV stabilizer, colorant, flame retardant, heat stabilizer, plasticizer, lubricant, mold release agent, filler, reinforcing agent, antioxidant agent, antistatic agent, blowing agent, or radiation stabilizer.

18. The blend of claim 1, wherein the polymer resin is a polycarbonate-polysiloxane copolymer having a siloxane content of from about 4 wt% to about 8 wt %, based on the total weight of the blend.

19. The blend of claim 1, wherein a plaque formed from the blend achieves a UL94 5VA rating at a thickness of 1.5 mm (±10%).

20. The blend of claim 1, wherein the polymer resin is a bisphenol-A homopolycarbonate; a copolycarbonate of bisphenol-A and 1, 1-bis(4-hydroxyphenyl)-3,3,5-trimethylcyclohexane); a copolyester polymer; a copolymer comprising: (i) an aromatic ester, (ii) an estercarbonate, and (iii) carbonate repeat units; a dimethyl bisphenol cyclohexane-co-bisphenol-A copolymer; a homopolycarbonate; a liquid crystal polymer; a methyl methacrylate-butadiene-styrene copolymer; a p-cumyl phenol capped poly(isophthalate-terephthalate-resorcinol ester)-co-(bisphenol-A carbonate) polymer; a poly(alkenylaromatic) polymer; a poly(methyl methacrylate) polymer; a poly(polyphosphonate)-co-(BPA carbonate) copolymer; a polyacetal; a polyamide; a polyamideimide; a polybutadiene; a polybutylene terephthalate polymer; a polyepoxide; a polyester; a polyesteramide; a polyestercarbonate; a polyester-polycarbonate; a polyether ether ketone; a polyether ketone; a polyether; a polyetherimide; a polyethersulfone; a polyimide; a polylactic acid (PLA); a polylactide; a polyolefin; a polyphenylene ether; a polyphenylene sulfide; a polyphenylsulfone; a polyphosphonate copolymer; a polyphosphonate polymer; a polysulfone; a polyurethane; a polyvinyl acetate; a polyvinyl fluoride; a polyvinylidene chloride; a polyvinylidene fluoride; a tetrabromo-bisphenol A polycarbonate copolymer; a thermoplastic polyester; an acrylic polymer; an aromatic polyester; an ethylene-acrylic ester-glycidyl acrylate terpolymer; an ethylene-tetrafluoroethylene copolymer; an ethylene-vinyl acetate copolymer; polyacrylonitrile; tetrafluoroethylene; or any combination thereof.

* * * * *